(12) United States Patent
Saho, III et al.

(10) Patent No.: US 7,975,647 B2
(45) Date of Patent: Jul. 12, 2011

(54) FLOW RESTRICTOR FOR MILKING APPARATUS

(75) Inventors: Frank Saho, III, Gnadenhutten, OH (US); Daniel E. Kandray, Sr., Gnadenhutten, OH (US); Thomas A. Lance, Tallmadge, OH (US); Aaron Kyle Kochman, Gnadenhutten, OH (US); Richard J. Carpenter, Canton, OH (US); Charles Jeffrey Laney, Navarre, OH (US)

(73) Assignee: Lauren AgriSystems, Ltd., New Philadelphia, OH (US)

( * ) Notice: Subject to any disclaimer, the term of this patent is extended or adjusted under 35 U.S.C. 154(b) by 21 days.

(21) Appl. No.: 12/234,693

(22) Filed: Sep. 21, 2008

(65) Prior Publication Data

US 2009/0078207 A1   Mar. 26, 2009

Related U.S. Application Data

(60) Provisional application No. 60/974,455, filed on Sep. 22, 2007.

(51) Int. Cl.
*A01J 5/16*   (2006.01)
*G05D 7/00*   (2006.01)
*F16K 27/04*   (2006.01)

(52) U.S. Cl. .................. 119/14.38; 119/14.44; 137/270; 137/103

(58) Field of Classification Search ............. 137/601.21, 137/601.19, 270, 103, 846, 513.7, 855, 859, 137/524, 513, 513.3; 119/14.44, 14.55, 14.38; 403/82; 251/310, 311

See application file for complete search history.

(56) References Cited

U.S. PATENT DOCUMENTS 2,321,995 A * 6/1943 Cockburn ................. 138/43
3,605,808 A * 9/1971 Fisher ................. 137/599.18

(Continued)

FOREIGN PATENT DOCUMENTS

WO   WO 95/18323   7/1995

OTHER PUBLICATIONS

Kochman, Laney and Spencer; Jan. 20, 2008; Effect of the Duration of the C Phase of Pulsation on Milking Performance; NMC Annual Meeting Proceedings 2008.

(Continued)

*Primary Examiner* — Rob Swiatek
*Assistant Examiner* — Joshua Huson
(74) *Attorney, Agent, or Firm* — Zollinger & Burleson Ltd.

(57) ABSTRACT

A milking apparatus that is used to extract milk from dairy animals includes a vacuum source, a milking liner cooperating with a shell to define a pulsation chamber; and a pulsator in fluid communication with the pulsation chamber and the vacuum source. The pulsator is configured to produce at least a four-phase milking cycle in the milking liner with the cycle including at least an A phase and a C phase. The A phase is wherein the liner is changed from a closed configuration to an open configuration during which the pulsator provides fluid communication between the pulsation chamber and the vacuum source. The C phase is wherein the liner is changed from an open configuration to a closed configuration during which the pulsator allows atmospheric air to flow into the pulsation chamber. A restrictor is disposed in the path of the fluid communication between the pulsator and the pulsation chamber with the restrictor slowing the C phase compared to the A phase.

16 Claims, 25 Drawing Sheets

U.S. PATENT DOCUMENTS

| | | | |
|---|---|---|---|
| 5,443,035 A | * | 8/1995 | Lind et al. ............ 119/14.02 |
| 5,970,910 A | * | 10/1999 | Grimm et al. ........... 119/14.02 |
| 2005/0015075 A1 | * | 1/2005 | Wright et al. ............ 604/535 |

OTHER PUBLICATIONS

Billon P., V. Gaudin 2001. Influence of the duration of a and c phase of pulsation on the milking characteristics and on udder health of dairy cows. ICAR Technical Series No. 7. Physiological and Technical Aspects of Machine Milking, p. 105, Nitra, Slovak Republic.

Spencer S. B., J. W. Shin G. W. Rogers J. B. Cooper Published Apr. 2007. Short Communication: Effect of Vacuum and Ratio on the Performance of a Monoblock Silicone milking Liner. J. Dairy Sci. 90: 1725-1729.

Spencer S. B., L. R. Jones 2000. Liner Wall Movement and Vacuum Measured by Data Acquisition. J. Dairy Sci. 83:1110-1114.

Whittlestone W. G. 1964. Bulletin: The Principles of Mechanical Milking. New South Wales Milk Board, Hamilton, New Zealand.

European Search Report dated Mar. 10, 2011 from application EP08016632; 5 pages.

* cited by examiner

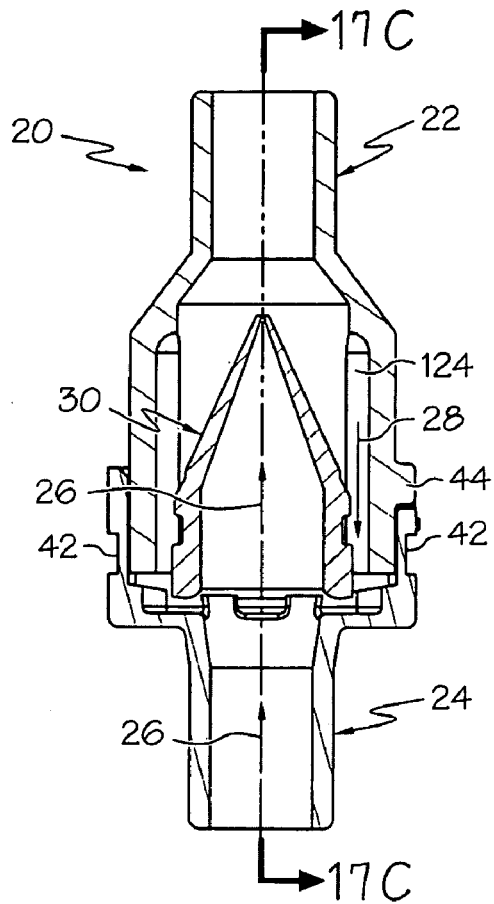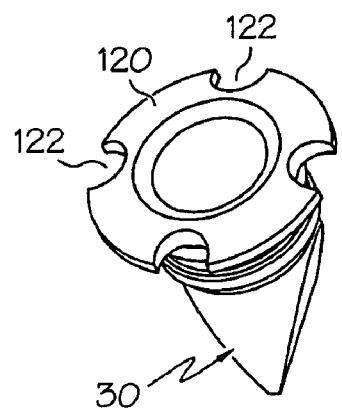
FIG. 17B
FIG. 17A
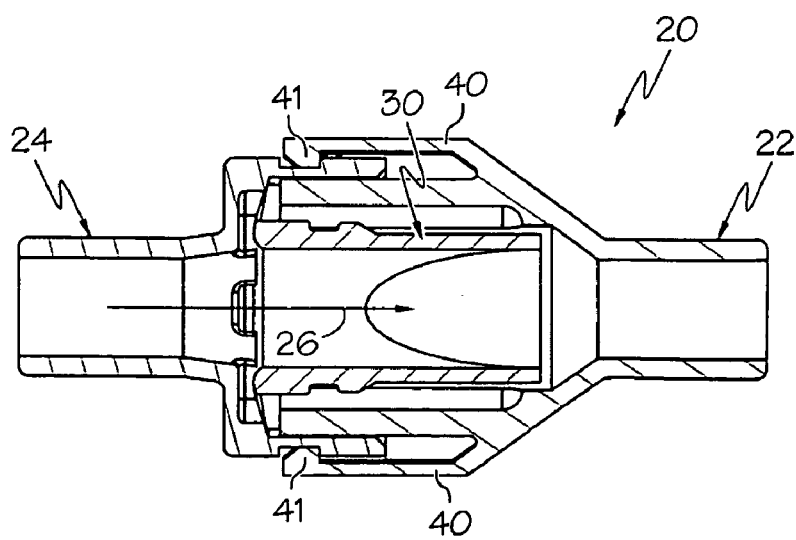
FIG. 17C

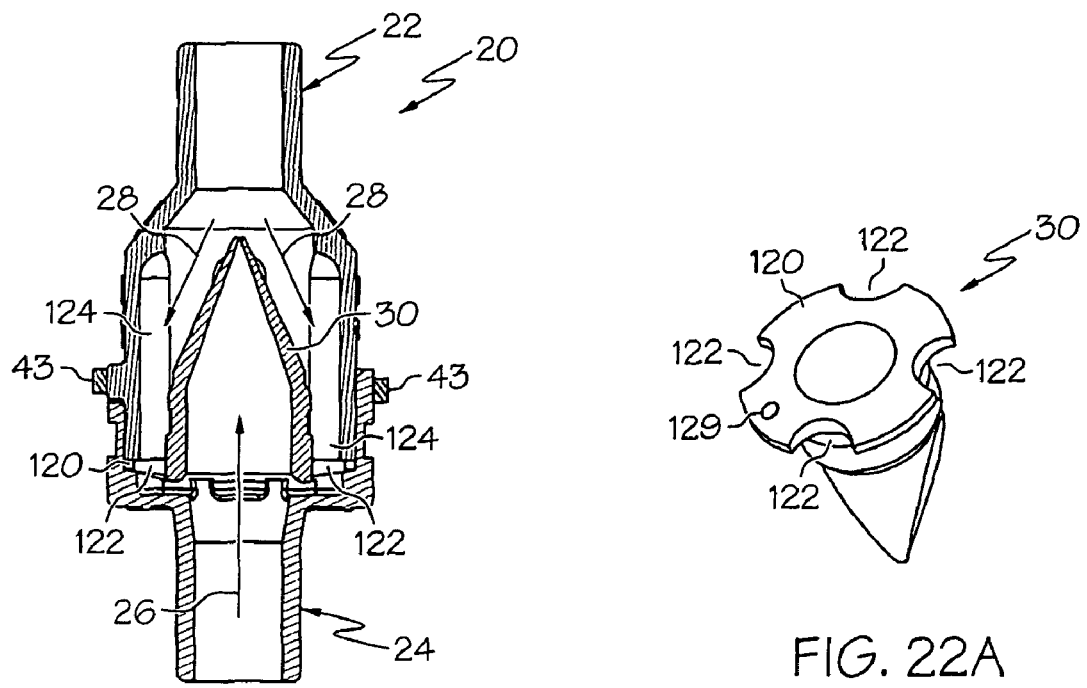
FIG. 22B
FIG. 22A
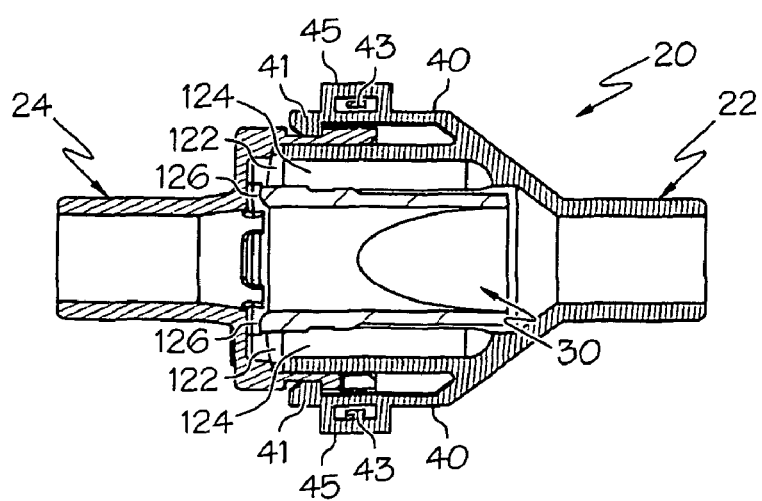
FIG. 22C

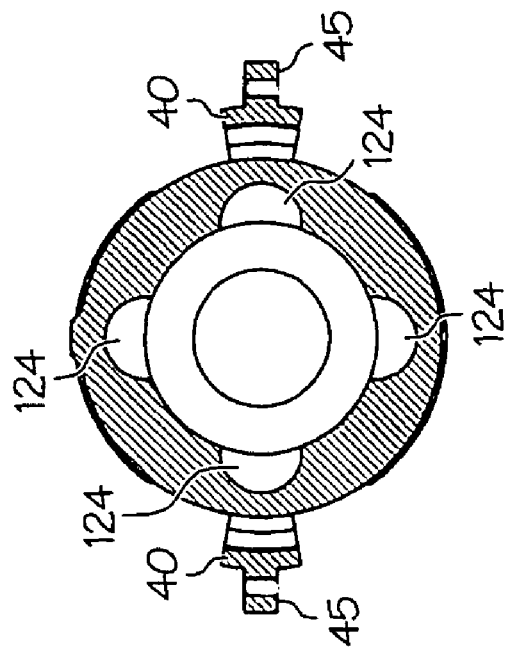
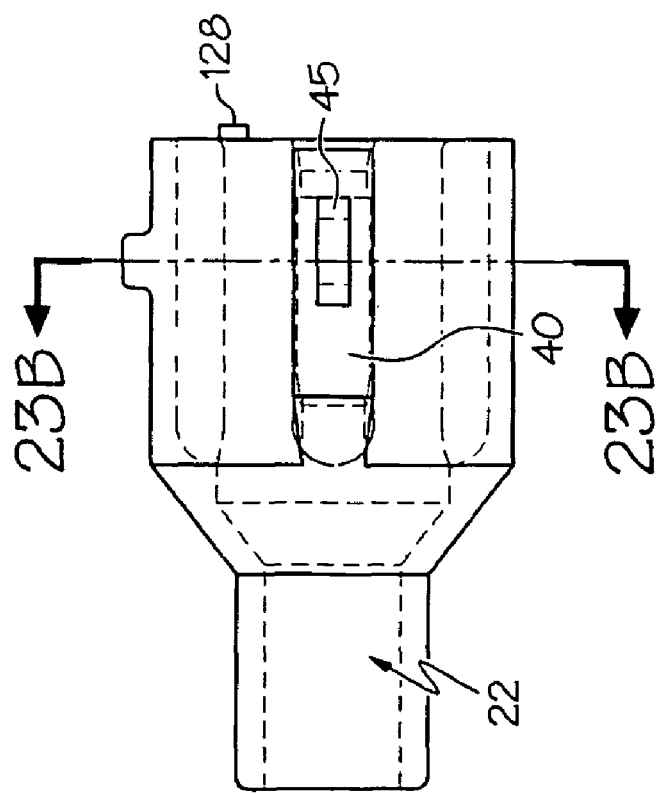

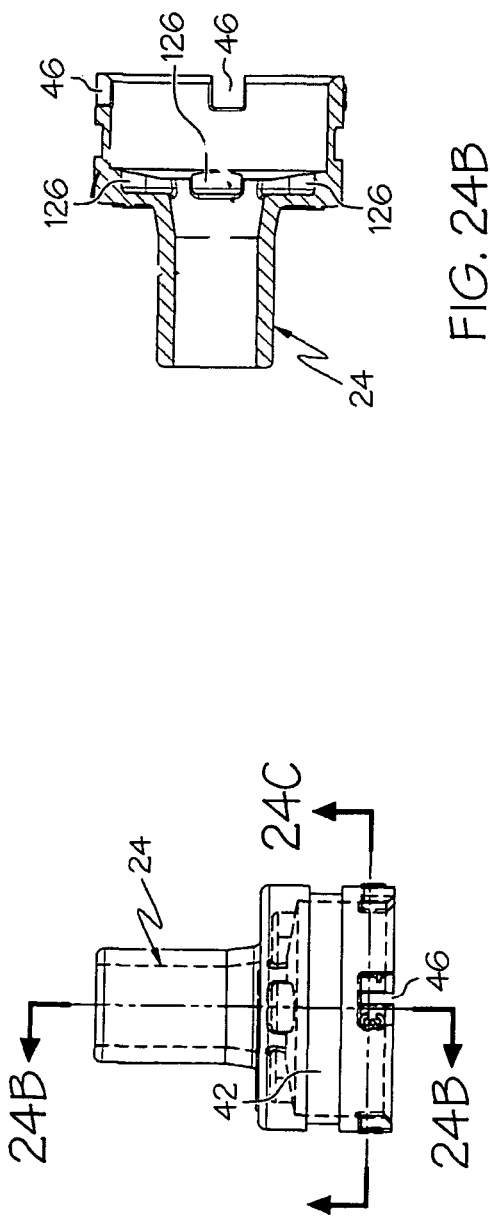
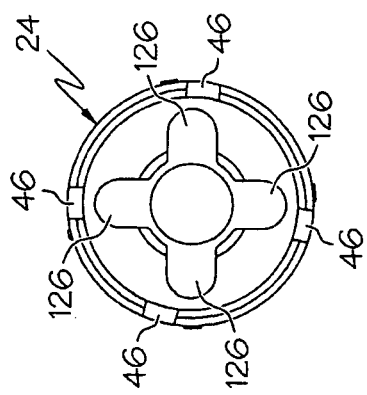
FIG. 24B
FIG. 24C
FIG. 24A

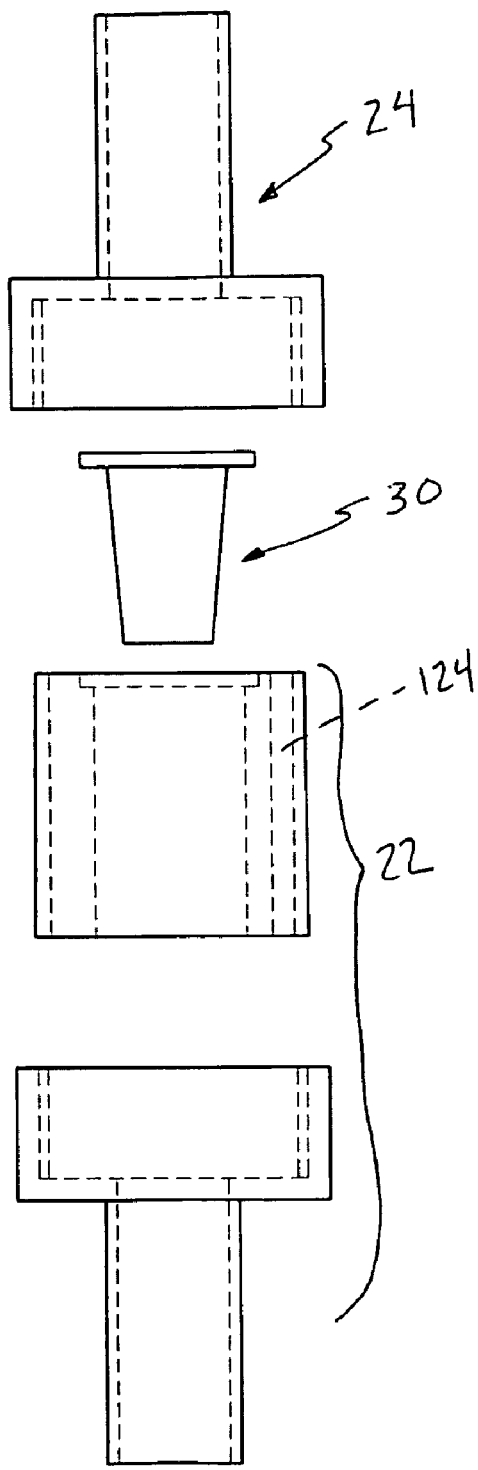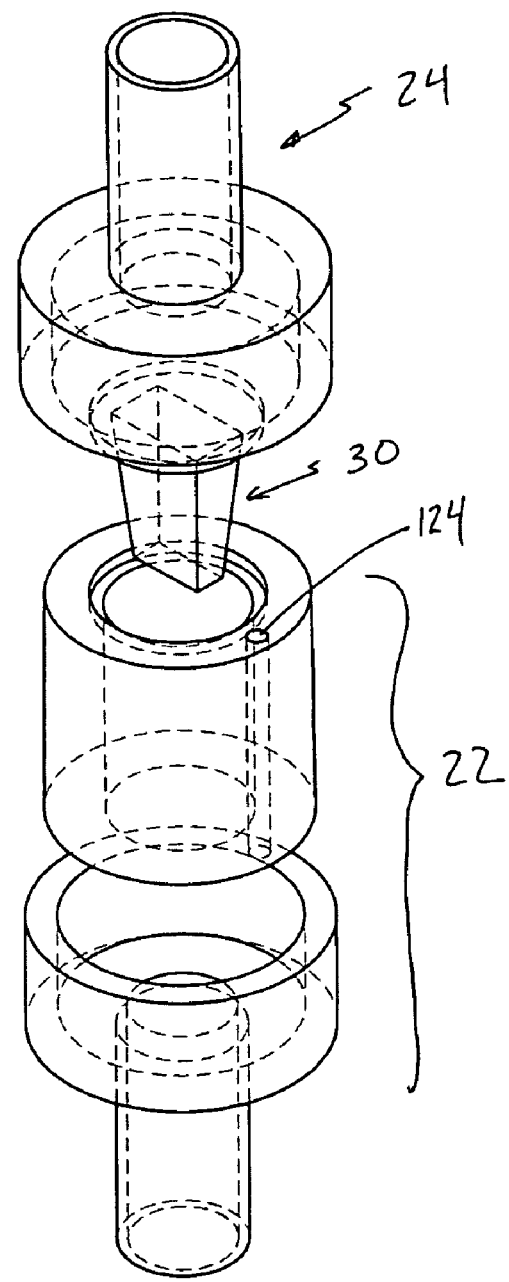
FIG. 25
FIG. 26

FLOW RESTRICTOR FOR MILKING APPARATUS

CROSS REFERENCE TO RELATED APPLICATIONS

This application claims the benefit of U.S. Provisional Patent Application Ser. No. 60/974,455 filed Sep. 22, 2007; the disclosures of which are incorporated herein by reference.

BACKGROUND OF THE INVENTION

1. Technical Field

The invention generally relates to automated milking apparatus and, more particularly, to a restrictor for controlling the "A" phase or the "C" phase of the pulsation process. Specifically, the invention relates to a restrictor that may be incorporated into the pulsation process to slow the "C" phase of the pulsation process to improve milking efficiency. One manner of positioning the restrictor is to splice the restrictor into the pulsator tube.

2. Background Information

An example of an automated milking machine is indicated generally by the numeral 1 in FIG. 1. Machine 1 is one example of a configuration known in the art to extractor milk from dairy animals. Milk extraction typically occurs in a milking facility where dairy animals are positioned in milking stalls. Milking machine 1 may be provided for each milking stall. Machine 1 generally includes a claw 2, multiple teatcups 3, a long milk tube 4, a long pulsator tube 5, and a pulsator 6. Claw 2 is an assembly that connects short pulsator tubes 7 and short milk tubes 8 from teatcups 3 to long pulsator tube 5 and long milk tube 4. A milk bucket 9 is provided to accumulate the milk extracted from the animal. A vacuum source 10 is fluid communication with machine 1.

As shown in FIG. 2, each teatcup 3 includes a rigid outer shell 11 that holds a soft milking liner or inflation 12. The annular space between shell 11 and liner 12 is a pulse or pulsation chamber 13. Liners 12 are attached to the teats 14 of a dairy animal to perform the milking process. The milking process is driven by applying a cyclic vacuum to pulsation chamber 13.

During milking, liner 12 is subjected to a milking vacuum 15 through short milk tube 8. FIG. 3 depicts the following pulsation process graphically. Pulsation chamber 13 is subjected to a pulsating vacuum that varies between approximate atmospheric pressure and a vacuum pressure that approximates or is greater than the milking vacuum applied to liner 12. The pulsating vacuum is controlled by pulsator 6. Pulsator 6 has a four-phase pulsation cycle defined by (i) an opening phase (the A phase) during which the pulsation vacuum 16 increases from atmospheric pressure to the milking vacuum level and liner 12 moves from a closed position to an open position (the pressure of liner 12 is indicated on the graph with reference line 17), (ii) an open phase (the B phase) during which the pulsating vacuum has reached its maximum level, which is substantially equal to the milking vacuum level, liner 12 is in an open position allowing milk to flow from teat 14, (iii) a closing phase (the C phase) during which the pulsating vacuum decreases from about the milking vacuum level to the atmospheric pressure and liner 12 moves from the open position to the closed position, and (iv) a closed phase (the D phase) during which the pulsating vacuum is equal to the atmospheric pressure and inflation 12 is in a closed position stopping milk flow from teat 14. The above action of pulsator 6 is referred to herein generally as the "pulsation process." The above phases are referred to as phase A, phase B, phase C, and phase D.

As shown in FIG. 2, pulsator 6 applies the different vacuum pressures of phases A-D to chamber 13 through a long pulsator tube 5 and a short pulsator tube 7. Tubes 5 and 7 are typically flexible tubing.

SUMMARY OF THE INVENTION

The invention provides an apparatus that restricts at least one of the phases of the pulsation process. In one configuration, the apparatus slows the C phase. The restriction may be adjustable.

The restrictor of the invention may be placed, by splicing or by using a pair of pulsator tubes, along the short, long, or both pulsator tubes. The restrictor slows the flow of atmospheric air back into the pulsation chamber thus slowing the C phase of the pulsation process. Slowing the C phase is believed to provide more efficient milking by decreasing the overall time required to extract milk.

The invention also provides a restrictor that may be used to slow the A phase by reversing the orientation of the restrictor along the short, long, or both pulsator tubes.

In one configuration, the invention provides a pulsator flow restrictor for a pulsator tube in an automated milking apparatus. The restrictor includes a restrictor body defining a main airflow pathway and an alternate airflow pathway; a check valve disposed in the main airflow pathway; and the alternate air pathway bypassing the check valve; the alternate airflow pathway having a lower flow rate than the main airflow pathway.

The invention provides a milking apparatus having: a vacuum source; a milking liner cooperating with a shell to define a pulsation chamber; a pulsator in fluid communication with the pulsation chamber and the vacuum source; the pulsator configured to produce at least a four-phase milking cycle in the milking liner; the cycle including at least an A phase and a C phase; the A phase being wherein the liner is changed from a closed configuration to an open configuration during which the pulsator provides fluid communication between the pulsation chamber and the vacuum source; the C phase being wherein the liner is changed from an open configuration to a closed configuration during which the pulsator allows atmospheric air to flow into the pulsation chamber; and a restrictor disposed in the path of the fluid communication between the pulsator and the pulsation chamber; the restrictor slowing the C phase compared to the A phase. The restrictor may have a main airflow pathway and an alternate airflow pathway; the flow rate through the alternate airflow pathway being slower than the flow rate through the main airflow pathway; the atmospheric air flowing into the pulsation chamber during the C phase being directed through the alternate airflow pathway.

In one configuration, the restrictor includes a body defining a main air pathway running from the inlet to the outlet. A check valve is mounted in the main air pathway. The check valve is to be open during the A phase and closed during the C phase of pulsation. The body of the restrictor also defines an alternate airflow pathway, which allows both vacuum and atmospheric air to pass through. In one configuration, the serpentine configuration of the alternate pathway slows the flow. In another configuration, the cross sectional area of the alternate airflow pathway is reduced compared to the cross sectional area of the main air pathway and thus reduces the flow. Another configuration uses an impediment such as a valve to reduce the flow. These configurations may be used alone or in combination to control the C phase flow. The flow rates may be adjustable.

Another configuration of the invention uses a bi-directional valve in the main airflow path. The bi-directional valve is configured to allow air to flow faster in one direction than the other. The flow rates may be adjustable.

A further configuration of the restrictor adjusts the flow rate by providing a body having first and second portions that receive the check valve. The first and second portions may be rotated with respect to each other to adjust the cross sectional area of the flow path. Indicators on the body portions may be provided to show the flow rate.

BRIEF DESCRIPTION OF THE DRAWINGS

FIGS. 4-7 depict a first exemplary configuration of the restrictor.

FIGS. 8-11 depict a second exemplary configuration of the restrictor.

FIGS. 12-15 depict a third exemplary configuration of the restrictor.

FIGS. 16-20 depict a fourth exemplary configuration of the restrictor.

FIG. 17A is section view taken along line 17A-17A of FIG. 16A.

FIG. 17B is a perspective view of the second end of the valve.

FIG. 17C is a section view taken along line 17C-17C of FIG. 17A.

FIG. 20 depicts different flow adjustments for the fourth configuration of the restrictor.

FIGS. 21-24 depict a fifth exemplary configuration of the restrictor.

FIG. 22A is a perspective view of the second end of the valve.

FIG. 22B is section view taken along line 22B-22B of FIG. 21A.

FIG. 22C is a section view taken along line 22C-22C of FIG. 22B.

FIG. 23A is a side view of the first body portion.

FIG. 23B is a section view taken along line 23B-23B of FIG. 23A.

FIG. 24A is a side view of the second body portion of the fifth configuration of the restrictor.

FIG. 24B is a section view taken along line 24B-24B of FIG. 24A.

FIG. 24C is a section view taken along line 24C-24C of FIG. 24A.

FIG. 25 is a side view of a sixth exemplary configuration of the restrictor.

FIG. 26 is a perspective view of the sixth configuration.

Similar numbers refer to similar, but not necessarily identical, parts throughout the specification.

DETAILED DESCRIPTION OF THE INVENTION

Figure 1:
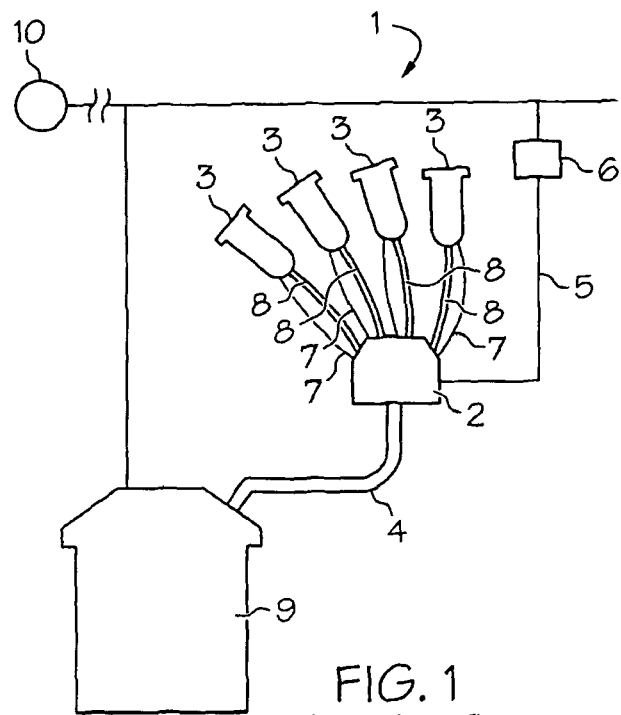
FIG. 1 is a schematic view of a portion of a prior art milking machine.
Figure 2:
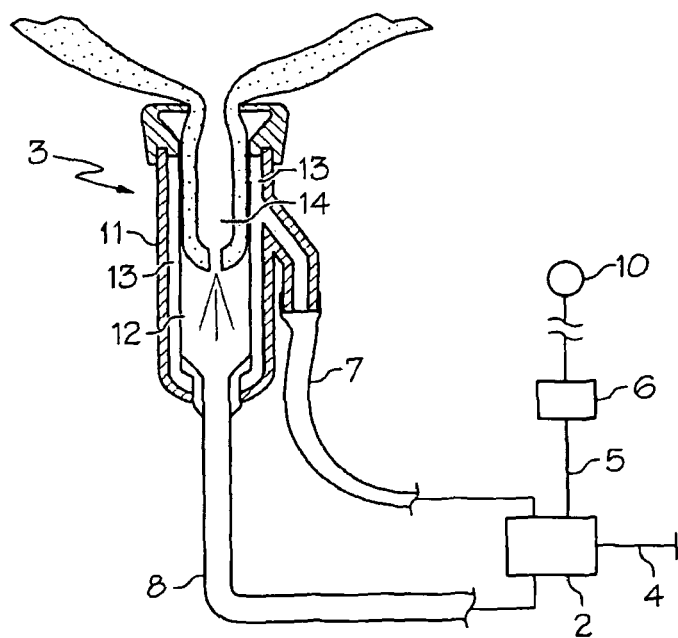
FIG. 2 is a schematic view of a portion of a prior art milking machine attached to a teat.
Figure 3:
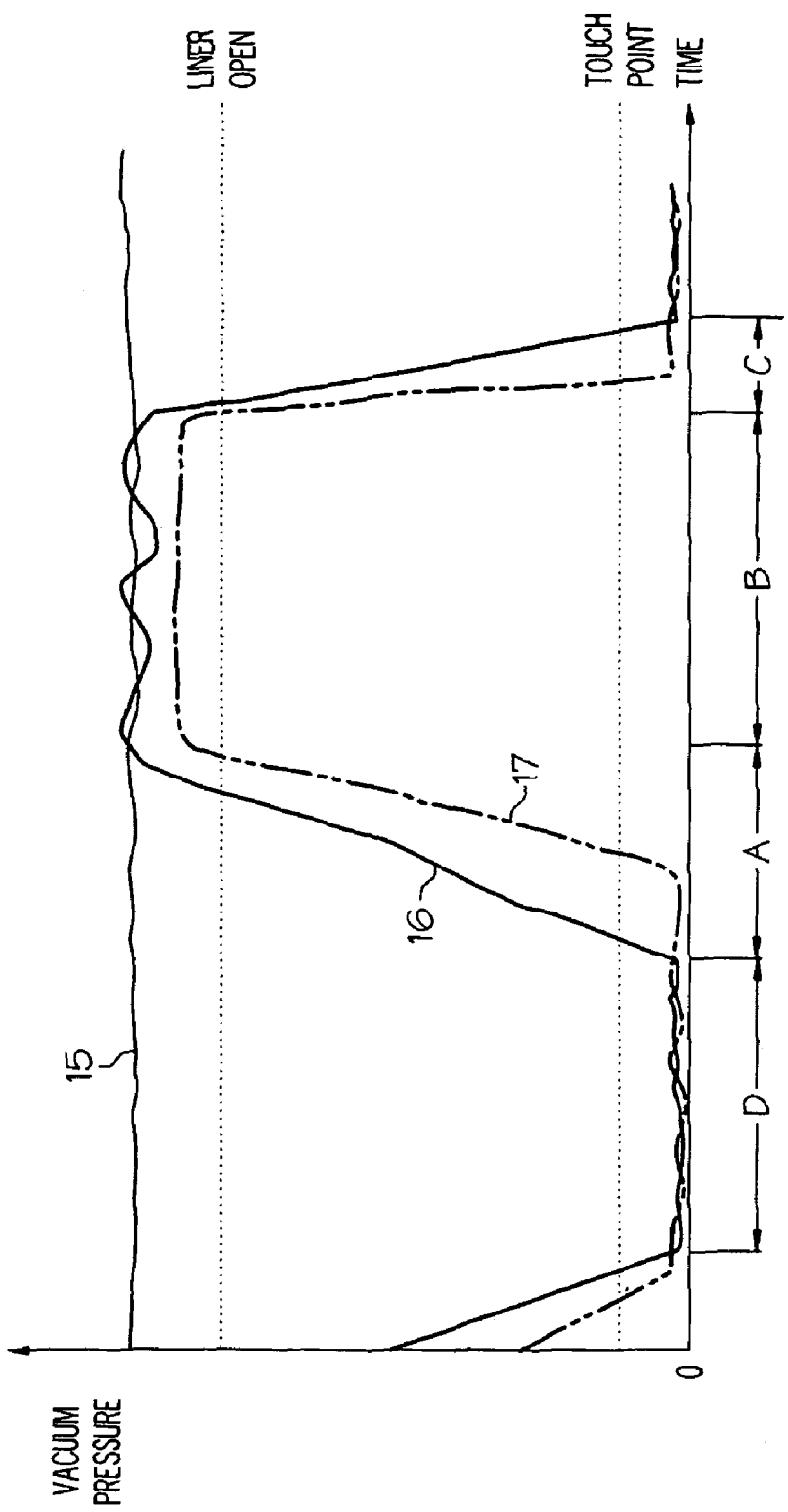
FIG. 3 is a graphical representation of the pulsation process.
Figure 4A:
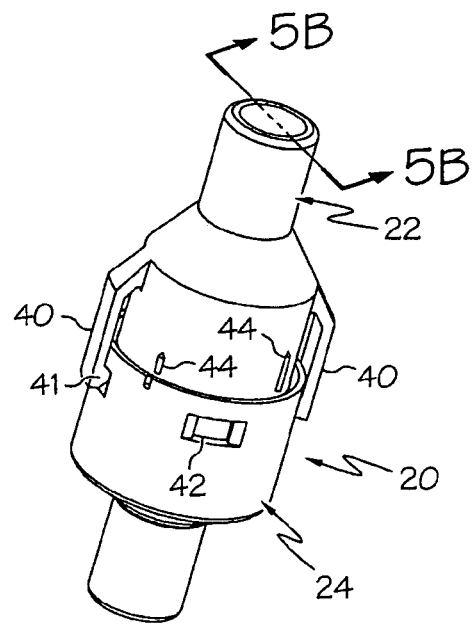
FIG. 4A is a perspective view of the first configuration of the restrictor.
Figure 4B:
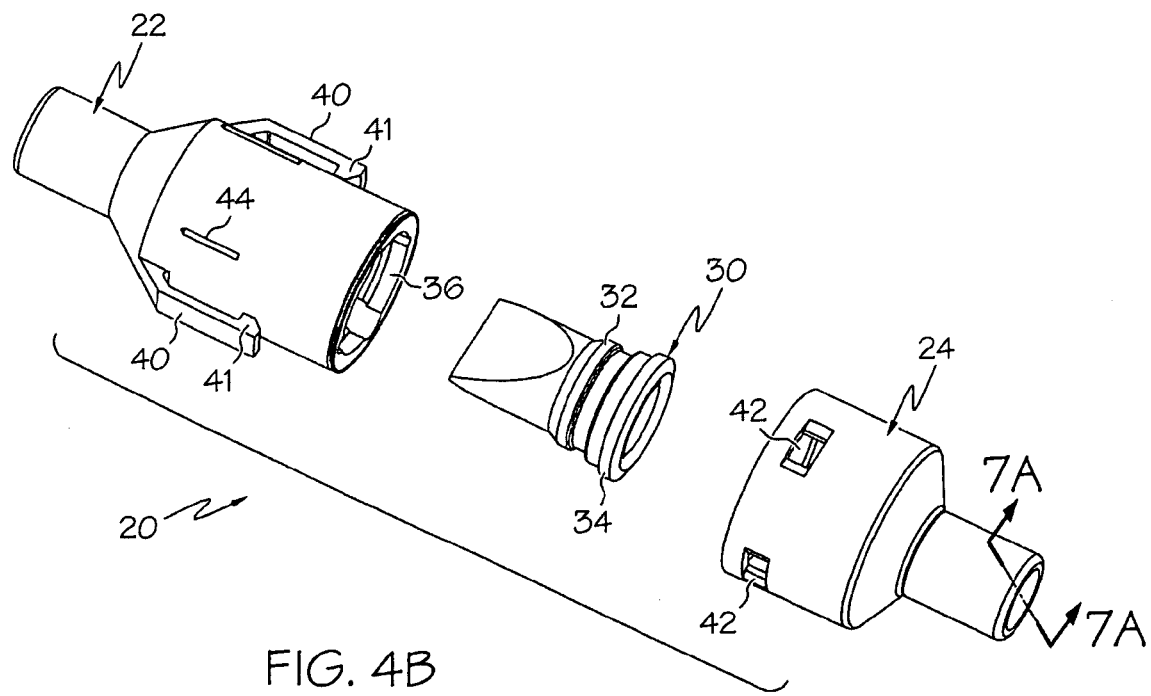
FIG. 4B is an exploded perspective view of the first configuration of the restrictor.
Figure 5B:
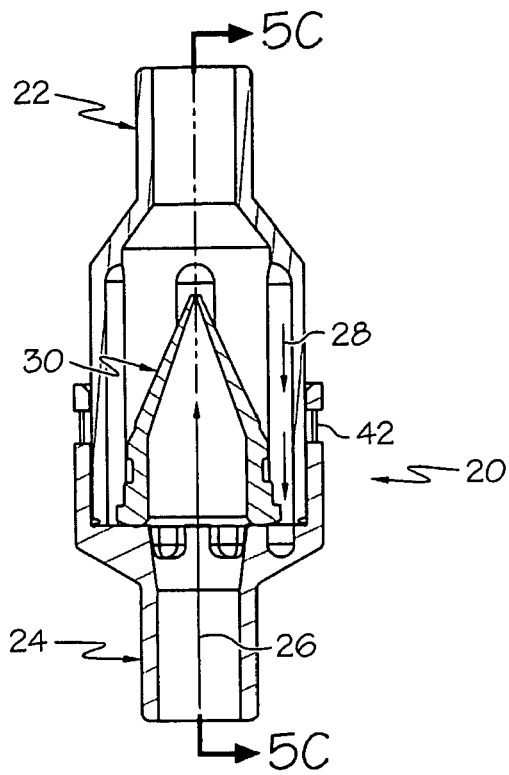
FIG. 5B is a section view taken along line 5B-5B of FIG. 4A.
Figure 5A:
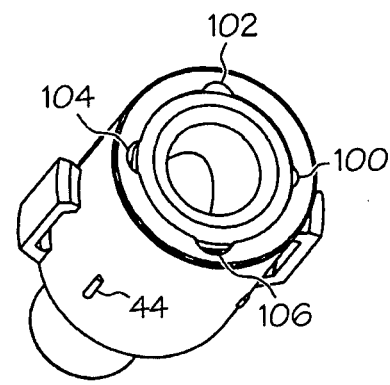
FIG. 5A is a perspective view of the rear end of the first body portion of the first configuration.
Figure 5C:
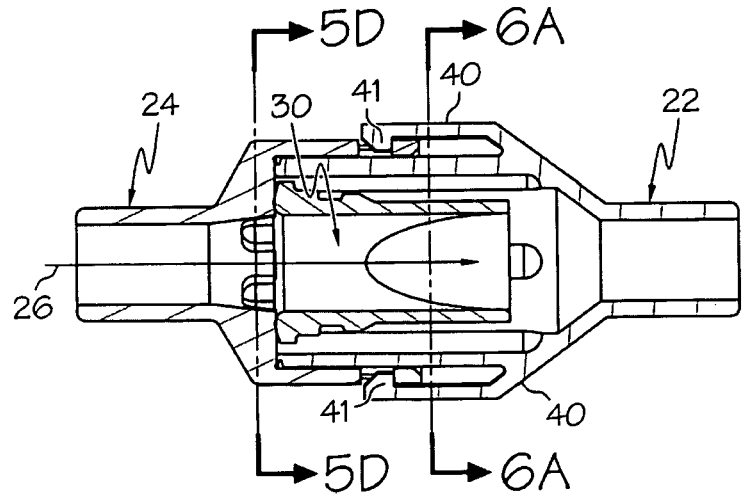
FIG. 5C is a section view taken along line 5C-5C of FIG. 5B.
Figure 5D:
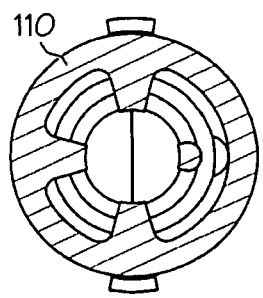
FIG. 5D is a section view taken along line 5D-5D of FIG. 5C.
Figure 6A:
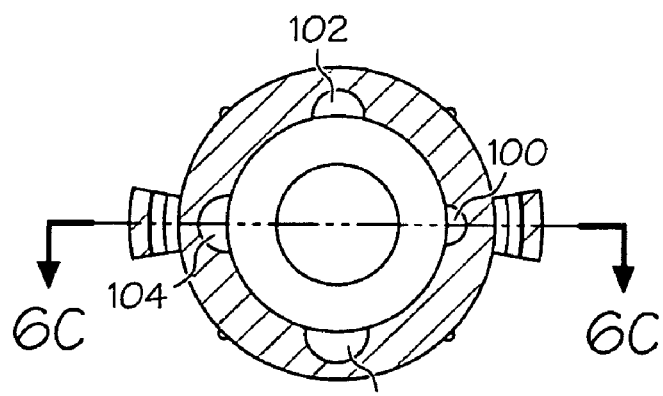
FIG. 6A is a section view taken along line 6A-6A of FIG. 5C.
Figure 6B:
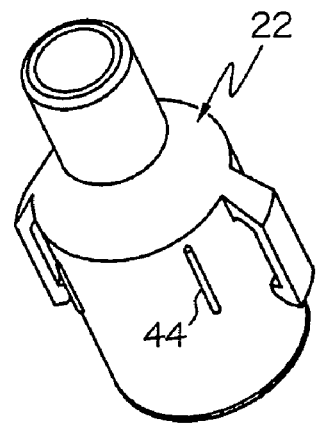
FIG. 6B is a perspective view of the front end of the first body portion.
Figure 6C:
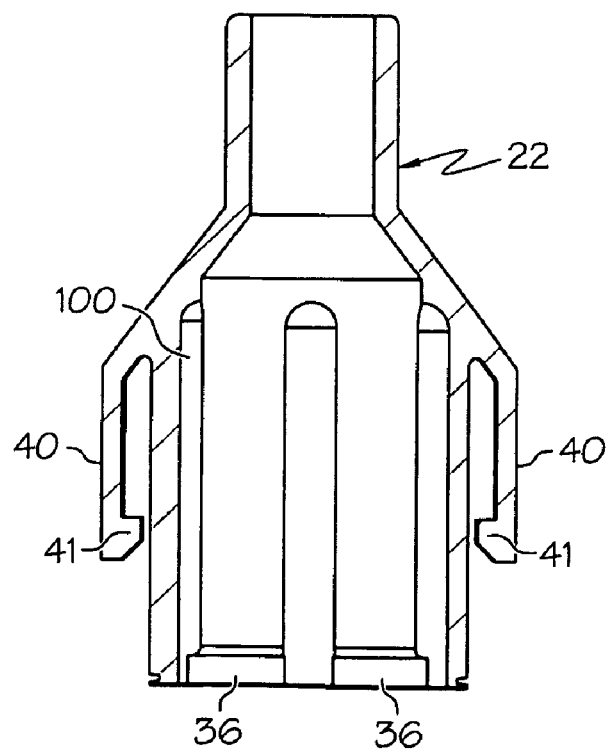
FIG. 6C is a section view taken along line 6B-6B of FIG. 4A.
Figure 7A:
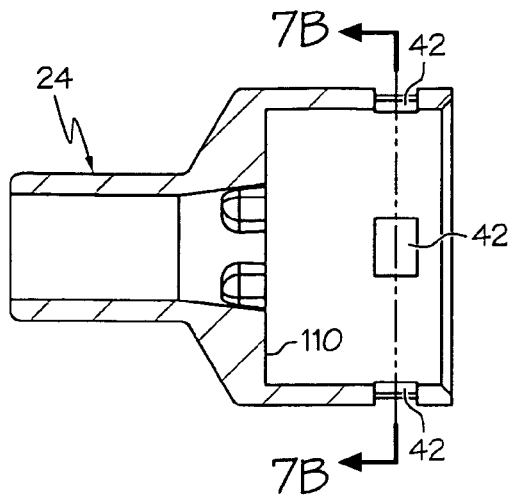
FIG. 7A is a section view taken along line 7A-7A of FIG. 4B.
Figure 7B:
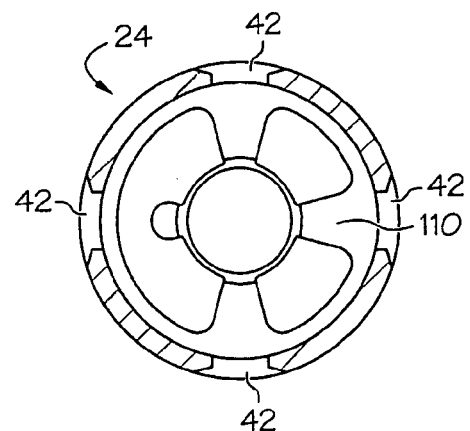
FIG. 7B is a section view taken along line 7B-7B of FIG. 7A.
Figure 7C:
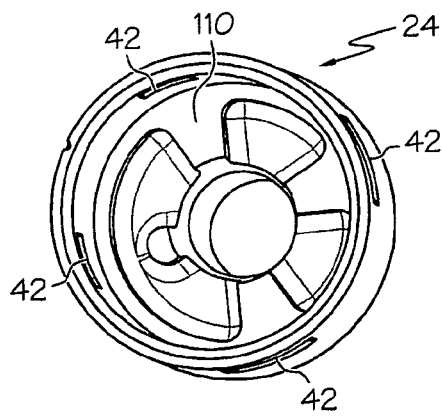
FIG. 7C is a perspective view looking into the second body portion.
Figure 7D:
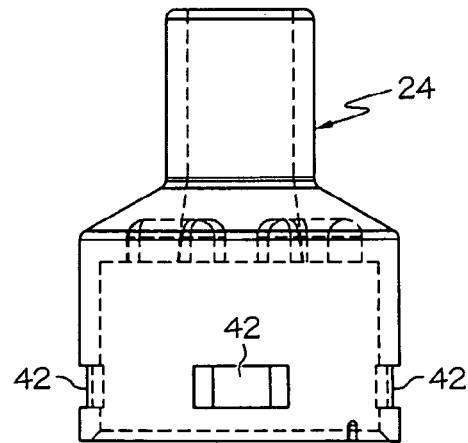
FIG. 7D is a side view of the second body portion.
Figure 8A:
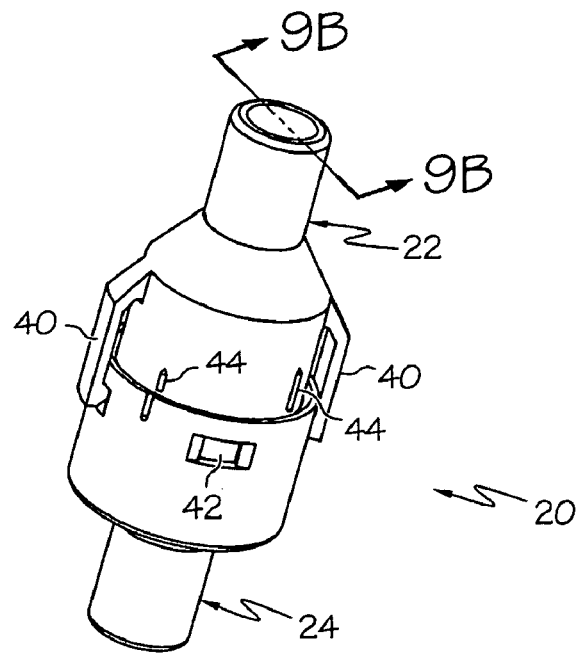
FIG. 8A is a perspective view of the second configuration of the restrictor.
Figure 8B:
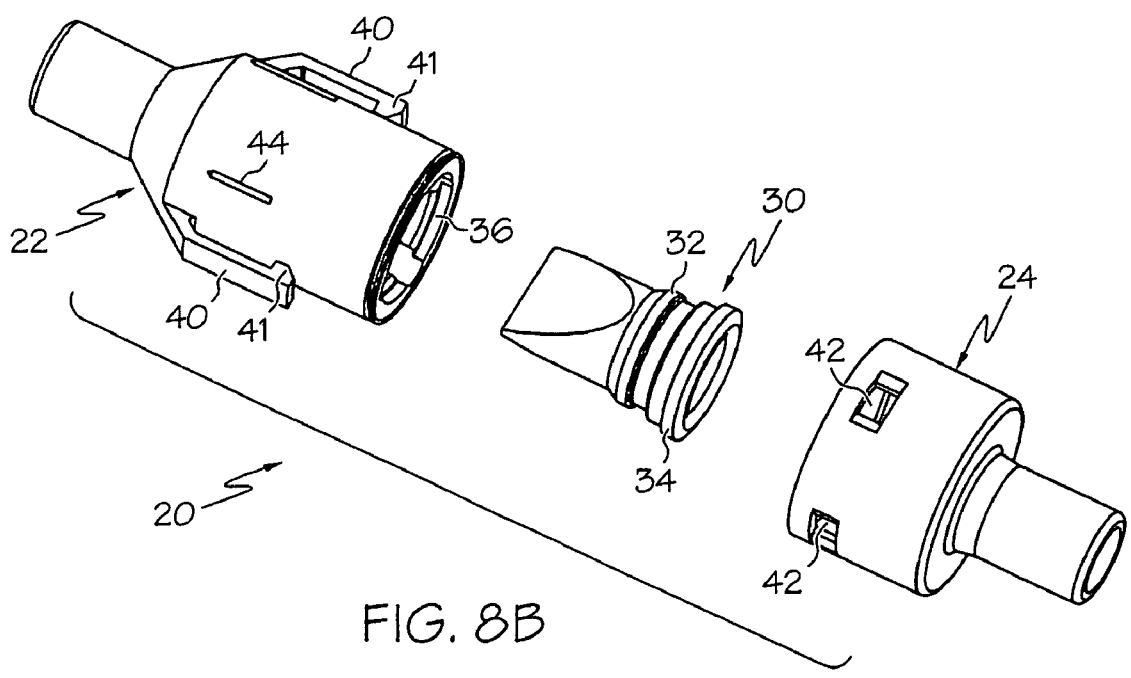
FIG. 8B is an exploded perspective view of the second configuration of the restrictor.
Figure 9A:
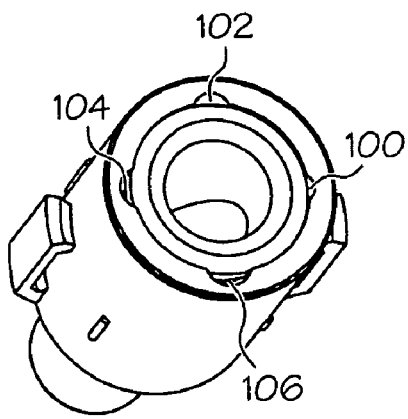
FIG. 9A is a perspective view of the rear end of the first body portion of the second configuration
Figure 9B:
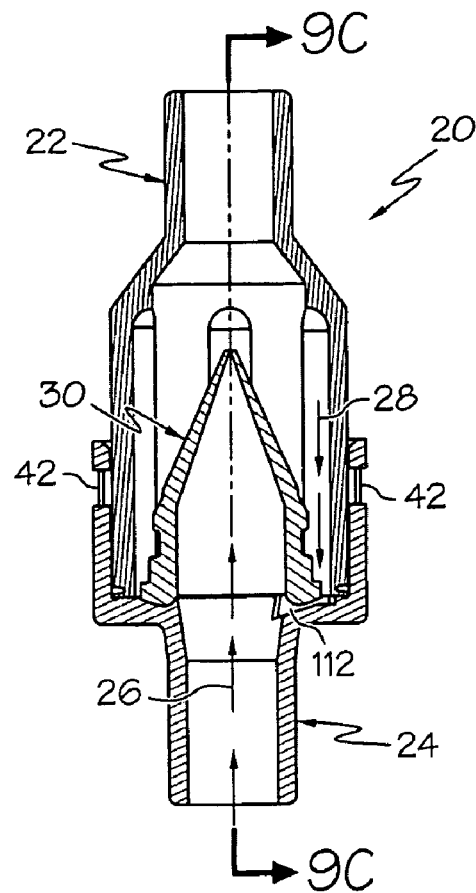
FIG. 9B is a section view taken along line 9B-9B of FIG. 8A.
Figure 9C:
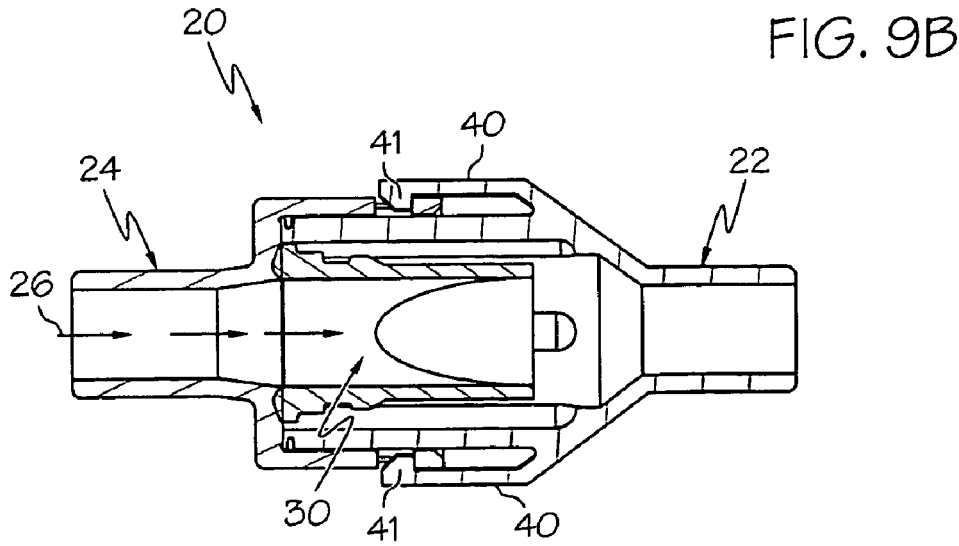
FIG. 9C is a section view taken along line 9C-9C of FIG. 9B.
Figure 10A:
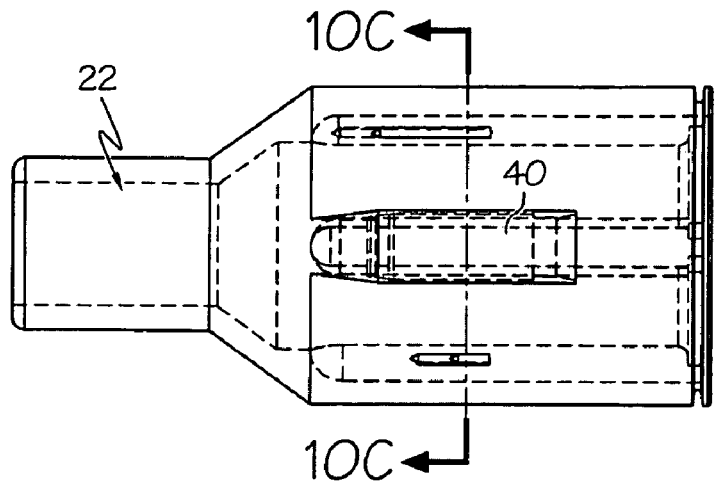
FIG. 10A is a side view of the first body portion of the second configuration.
Figure 10B:
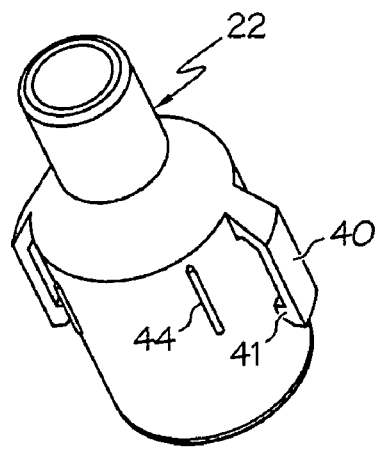
FIG. 10B is a perspective view of the first end of the first body portion.
Figure 10C:
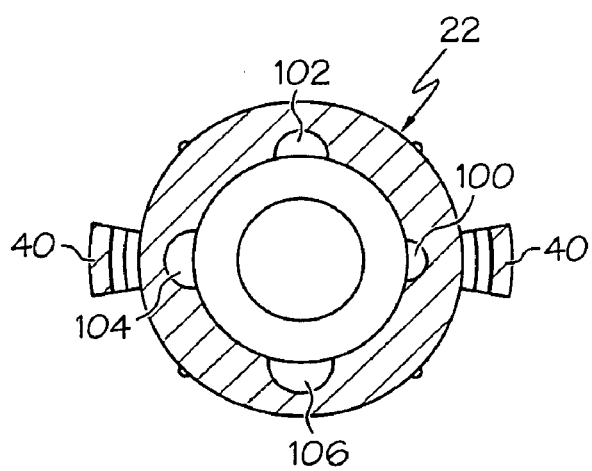
FIG. 10C is a section view taken along line 10C-10C of FIG. 10A.
Figure 11A:
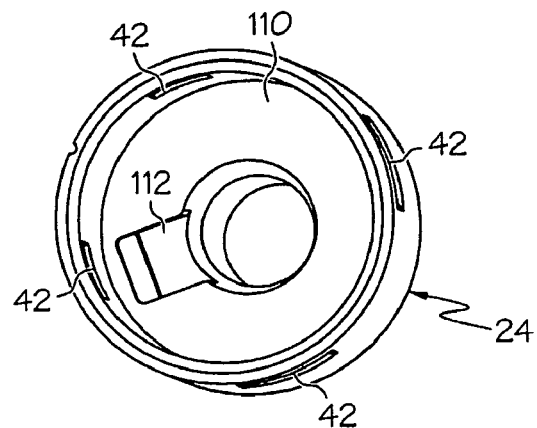
FIG. 11A is a perspective view looking into the second body portion.
Figure 11B:
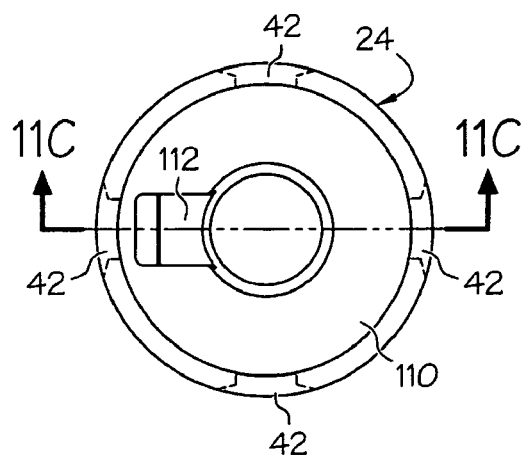
FIG. 11B is an end view of the second body portion.
Figure 11C:
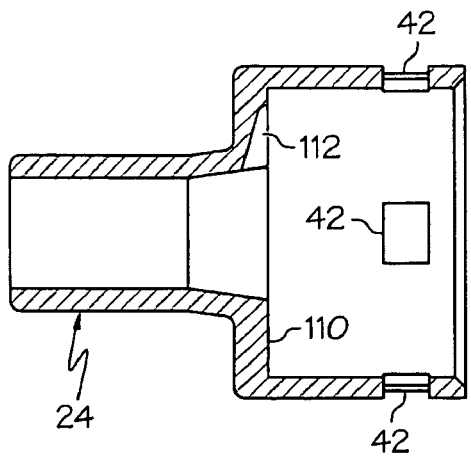
FIG. 11C is a section view taken along line 11C-11C of FIG. 11B.

The restrictor configurations of the invention allow the speed of the A and C phases of the pulsation process to be changed. The amount of the change can be determined by using a tool that measures air pressure over time. The results of such a measurement can be presented in a graph such as that shown in FIG. 3 wherein the A-D phases are graphically represented. These phases are also commonly referred to the opening and closing of liner 12. The A phase is the opening of liner 12, the B phase is when liner 12 is open and is called the "milking phase", the C phase is the closing of liner 12, and the D phase is when liner 12 is closed and is called the "rest phase". The restrictor of the invention may be used to change the "C" phase (atmospheric air entering chamber), while not substantially changing the "A" phase (vacuum in the chamber). When used to change the "C" phase, an alternate airflow pathway or a plurality of alternate airflow pathways are provided by the restrictor of the invention to determine the speed of the "C" phase. This is accomplished by changing the size, shape, length, or number (or a combination of all) of the alternate airflow pathway or pathways.

A typical use of the restrictor is to alter the C phase by lengthening the C phase and shortening the D phase while not substantially changing the A and B phases. An alternative use is to alter the A phase by lengthening the A phase while shortening the B phase while not substantially changing the C and D phases. Lengthening the C phase is believed to increase milking efficiency by decreasing the time required to extract milk.

FIGS. 4-24 depict the construction and assembly of exemplary pulsator restrictor configurations. In each of the configurations of FIGS. 4-24, the reference numeral 20 is used to generally indicate a restrictor having a first body portion 22 and a second body portion 24 that connect together to define a main airflow pathway 26 and at least one alternate airflow pathway 28 with a check valve 30 disposed in at least main airflow pathway 26. In one configuration, valve 30 is a bi-directional valve that allows less air flow in one direction than the other. When valve 30 is configured to be bi-directional, the alternate airflow pathways described below are not necessarily needed for restrictor 20 to function as the reduced air flow rate back through valve 30 is enough to slow the A or C phase as desired. In another configuration, valve 30 allows air to flow substantially freely in the direction from its base towards its taper while permitting little or no airflow in the other direction. When valve 30 is configured in this manner, the air flow back through valve is directed through the alternate airflow pathway or pathways described below to achieve the desired slowing. Valve 30 is formed from a flexible and resilient material that substantially seals against the surfaces of the body portions. Valve 30 may include one or more raised rings 32 that engage the inner portion of first body portion 22 to form a good seal. Valve 30 may also include a flange 34 at its base that fits tightly within a recess 36 defined by first body portion 22 such that the end of flange 34 engages the inner surface 110 of second body portion 24. The configurations of FIGS. 4-24 allow the alternate airflow pathway 28 to be adjusted by rotating body portions 22 and 24 with respect to each other. Each body portion 22 and 24 is configured to be readily attached to a flexible tube of the sort typically used as a pulsator tube 5 or 7. As such, each body portion 22 and 24 may have a tube-shape end adapted to fit over or inside a pulsator tube 5 or 7.

In each of the configurations of FIGS. 4-24, first body portion 22 includes a pair of cantilevered, resilient arms 40 that are received in a snap-fit connection into a portion of second body portion 24. Arms 40 hold body portions 22 and 24 together with valve 30 trapped inside aligned main airflow pathway 28. The position of arms 40 may be reversed so that arms 40 cantilever from second body portion 24. Each arm 40 includes a hand 41 having a catch surface that cooperates with a corresponding catch surface defined by second body portion 24. Each hand 41 also defines an angled wall that engages a portion of second body portion 24 when body portions 22 and 24 are brought together to force arms 40 outwardly. An external band 43 (shown in FIGS. 21 and 22) may be used to hold arms 40 of any configuration in place after they have engaged second body portion 24. In the fifth exemplary configuration, each arm defines has a band loop 45 that defines an opening configured to receive band 43 to hold band 43 on arms 40. Band 43 may be a toothed strap that locks to itself in a manner similar to a plastic wire tie.

In the first and second configurations of restrictor 20, second body portion 24 defines spaced slots 42. In these configurations, the catch surface of arms 40 engages an edge wall that defines slots 42. Aggressive rotation of body portions 22 and 24 may snap arms 40 out of slots 42 and allow free rotation of first and second body portions 22 and 24 with respect to each other. Body portions 22 and 24 may be rotated with respect to each other while they are seated (one body portion inside the other) together. The relative angular position of the first 22 and second 24 body portions defines the flow rate through alternate airflow pathway 28. Indicators 44 are used to show the user which flow rate is selected. Indicators 44 may be numbered or provided in different sizes that relate to the flow rate. In the first and second configurations of FIGS. 4-11, first body portion 22 defines a plurality of alternate airflow pathways 100, 102, 104, and 106 (See FIGS. 6 and 10) having different cross sectional areas. Body portions 22 and 24 are rotated to change the angular position of the body portions to open only one or a selected combination of pathways 100-106 to alter the cross section of alternate airflow pathway. Inner face 110 of second body portion 24 seals the three pathways that are not selected for use. In the first configuration, inner surface is configured to allow different combinations of pathways to be selected. In the second configuration, surface 110 defines a single recess 112 that open one pathway 100-106 as each rotated into alignment with recess 112.

In the third-fifth configurations of restrictor 20, the catch surface of arms 40 engages an edge wall that defines a continuous slot 42. In these configurations, a protruding indicator knob 44 is received in one of a series of spaced cutouts 46 defined about the circumference of second body portion 24 to lock the position of the first body portion 22 with respect to the second body portion 24. The positions of knob 44 and cutouts 46 may be reserved such that knob 44 extends from second body portion 24 with first body portion 22 defining cutouts 46. The engagement of indicator knob 44 in slot cutout 46 prevents the first and second body portions from rotating with respect to each other about their longitudinal axis. Body portions 22 and 24 are configured to allow knob 44 to be slid out of cutout 46 without completely unseating portions 22 and 24. The relative position of the first and second body portions 22 and 24 defines the flow rate through alternate airflow pathway 28.

Figure 12A:
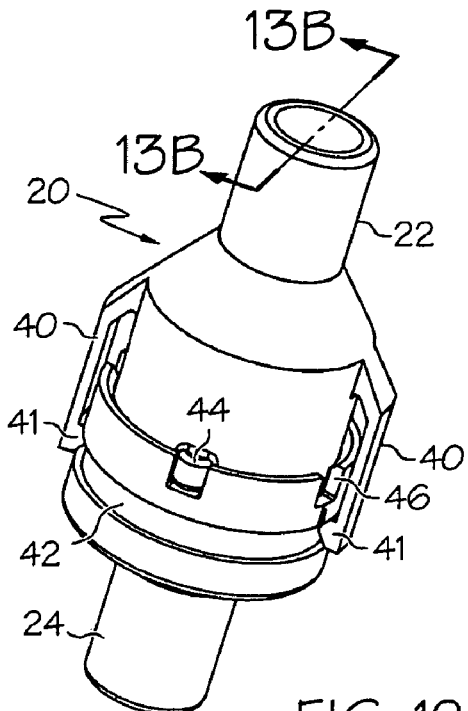
FIG. 12A is a perspective view of the third configuration of the restrictor.
Figure 12B:
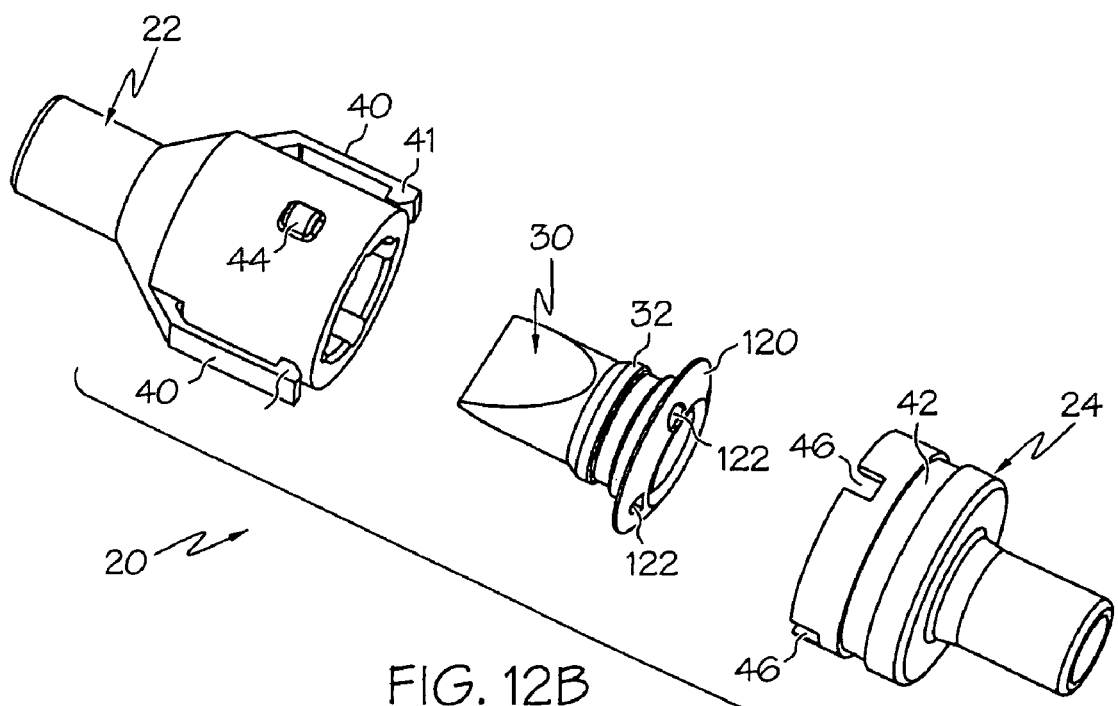
FIG. 12B is an exploded perspective view of the third configuration of the restrictor.
Figure 13A:
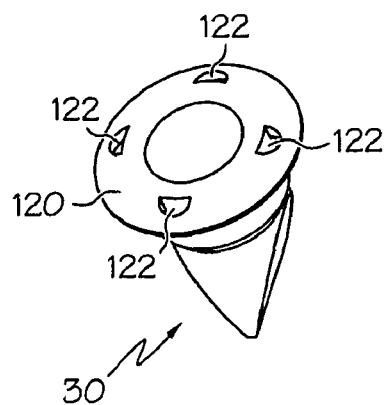
FIG. 13A is a perspective view of the second end of the valve.
Figure 13B:
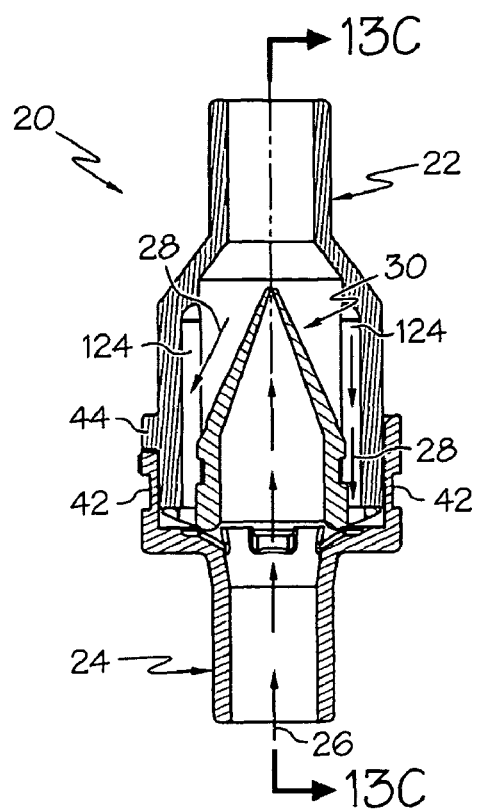
FIG. 13B is a section view taken along line 13B-13B of FIG. 12 A.
Figure 13C:
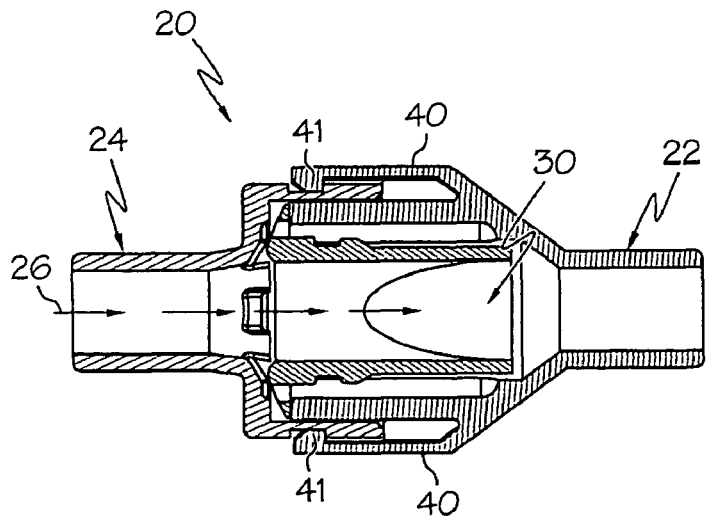
FIG. 13C is a section view taken along line 13C-13C of FIG. 13B.
Figure 14A:
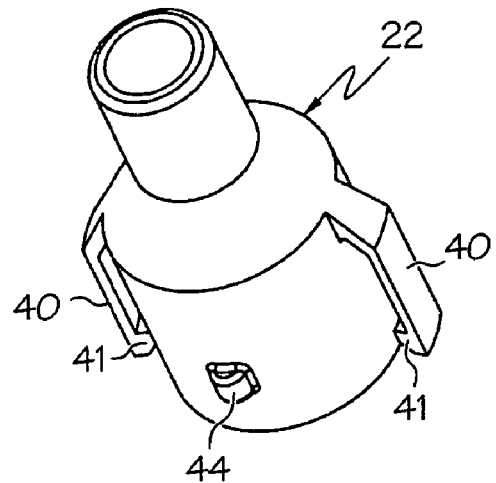
FIG. 14A is a perspective view of the first end of the first body portion of the third configuration.
Figure 14B:
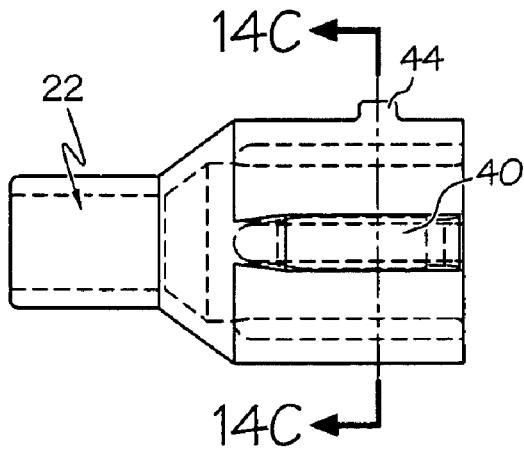
FIG. 14B is a side view of the first body portion.
Figure 14C:
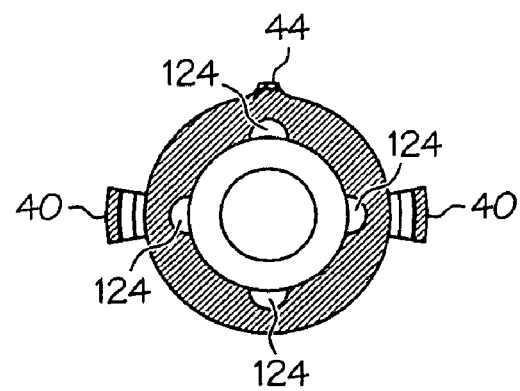
FIG. 14C is a section view taken along line 14C-14C of FIG. 14B.
Figure 15A:
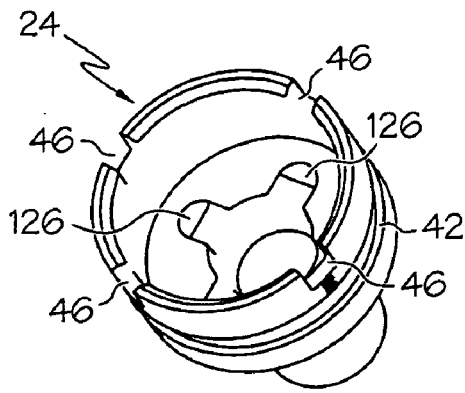
FIG. 15A is a perspective view looking into the second body portion of the third configuration.
Figure 15B:
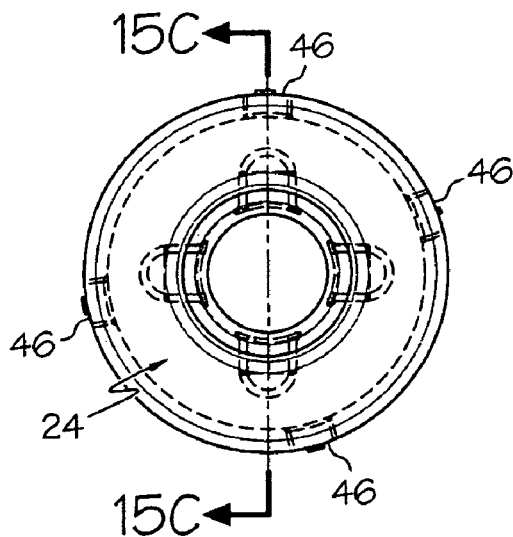
FIG. 15B is an end view of the second body portion.
Figure 15C:
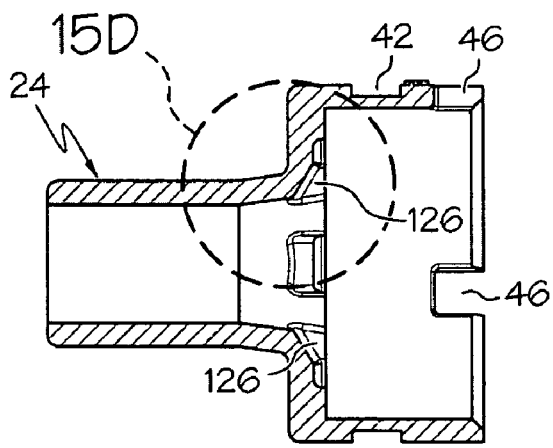
FIG. 15C is a section view taken along line 15C-15C of FIG. 15B.
Figure 15D:
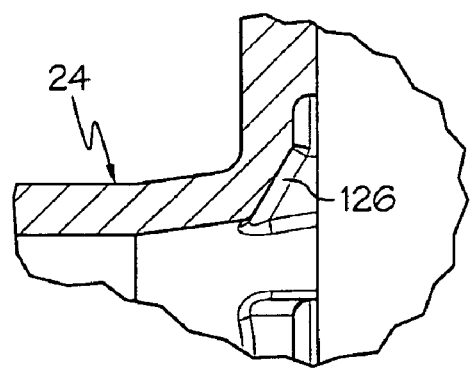
FIG. 15D is an enlarged view of the encircled portion of FIG. 15C.
Figure 16A:
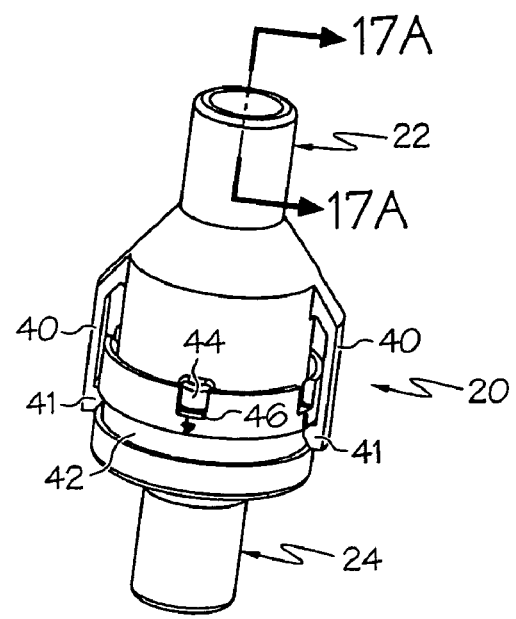
FIG. 16A is a perspective view of the fourth configuration of the restrictor.
Figure 16B:
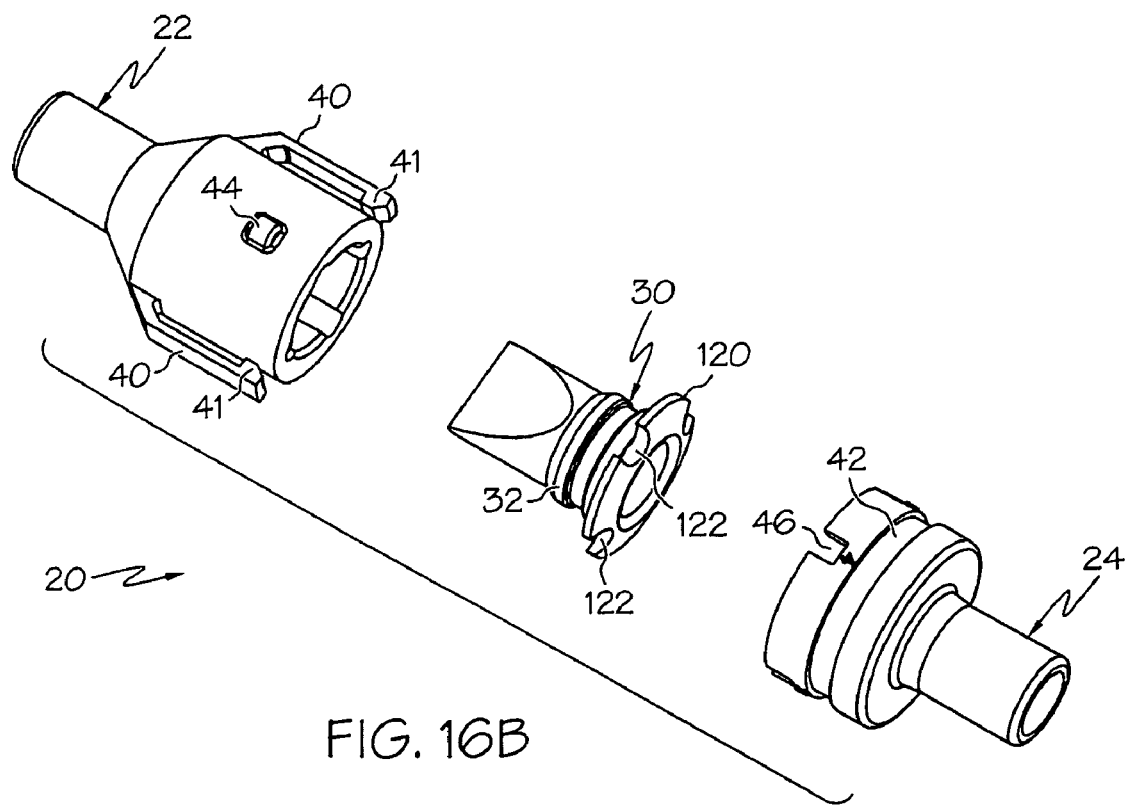
FIG. 16B is an exploded perspective view of the fourth configuration of the restrictor.
Figure 18A:
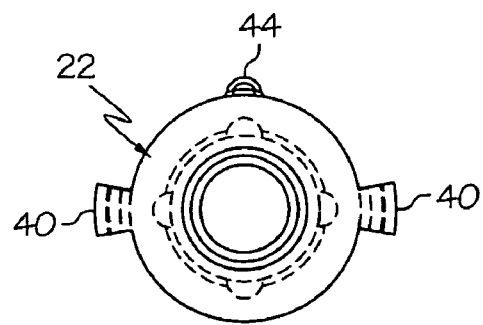
FIG. 18A is an end view of the first body portion.
Figure 18B:
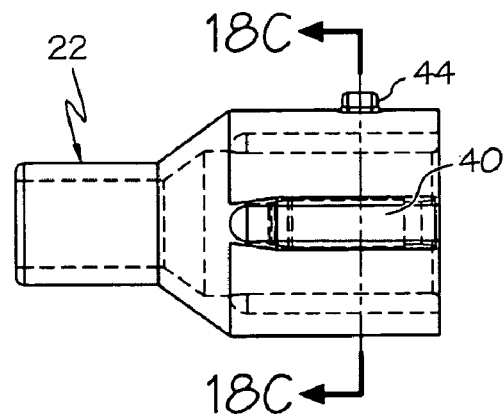
FIG. 18B is a side view of the first body portion.
Figure 18C:
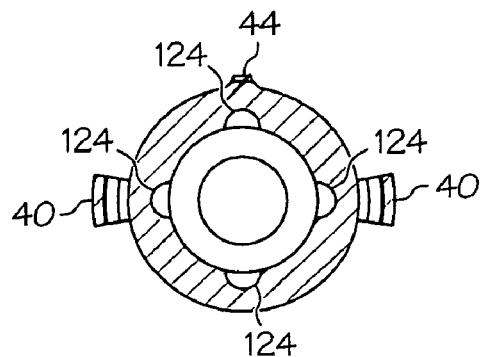
FIG. 18C is a section view taken along line 18C-18C of FIG. 18B.
Figure 19A:
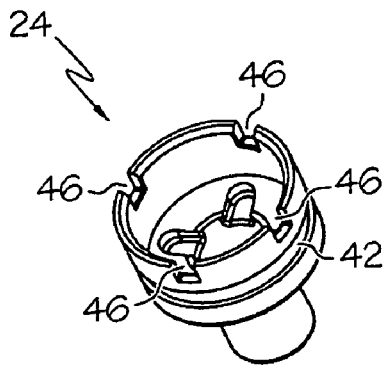
FIG. 19A is a perspective view looking into the second body portion of the fourth configuration of the restrictor.
Figure 19B:
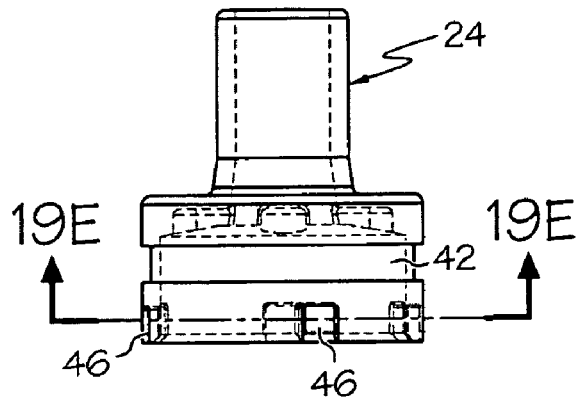
FIG. 19B is a side view of the second body portion.
Figure 19C:
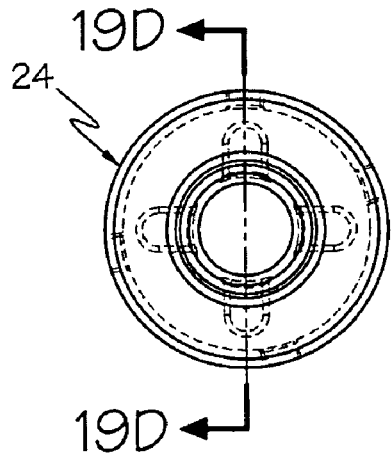
FIG. 19C is an end view of the second body portion.
Figure 19D:
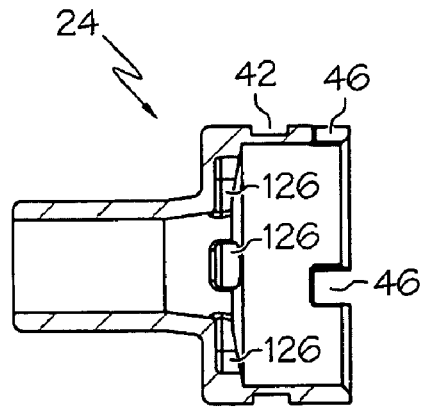
FIG. 19D is a section view taken along line 19D-19D of FIG. 19C.
Figure 19E:
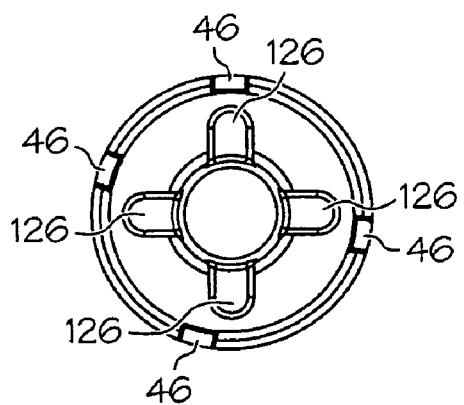
FIG. 19E is a section view taken along line 19E-19E of FIG. 19B.

In the configurations of FIGS. 12-24, valve 30 includes a flange 120 that extends in a direction substantially perpendicular to the longitudinal axis of valve 30 and extends over at least a portion of the end of first body portion 22. Flange 120 defines a plurality of notches 122 (may be notch holes 122 as shown in FIG. 12B) that define a portion of alternate airflow pathway 28. The relative position of body portions 22 and 24 defines the percentage of blockage for passageway 28 as shown, for example, in FIG. 20. Cutouts 46 are positioned at different angles about body portion 24 so that the engagement of knob 44 with each cutout 46 provides a different percentage of blockage for alternate passageway 28.

Body portion 22 defines at least one channel 124 but may define a plurality of channels 124 such as the four channels shown in the drawings. Each channels 124 runs along valve 30 and may be used as a portion of alternate airflow passageway 28. The number of notches 122 in flange 120 defines the number of channels 124 that are used as part of alternate passageway 28. Although four notches 122 are show in the drawings, valve 30 may be provided with 1-4 notches 122. When a notch 122 is defined for each channel 124, each channel 124 may be used. In some configurations, the number of notches 122 in flange 120 may be less than the number of channels 124. Reducing the number of notches 122 allows restrictor to be tuned to different flow rates simply by replacing valve 30. Second body portion 24 defines elbows 126 that form a portion of passageway 28 when they are aligned with notches 122.

Figure 20:
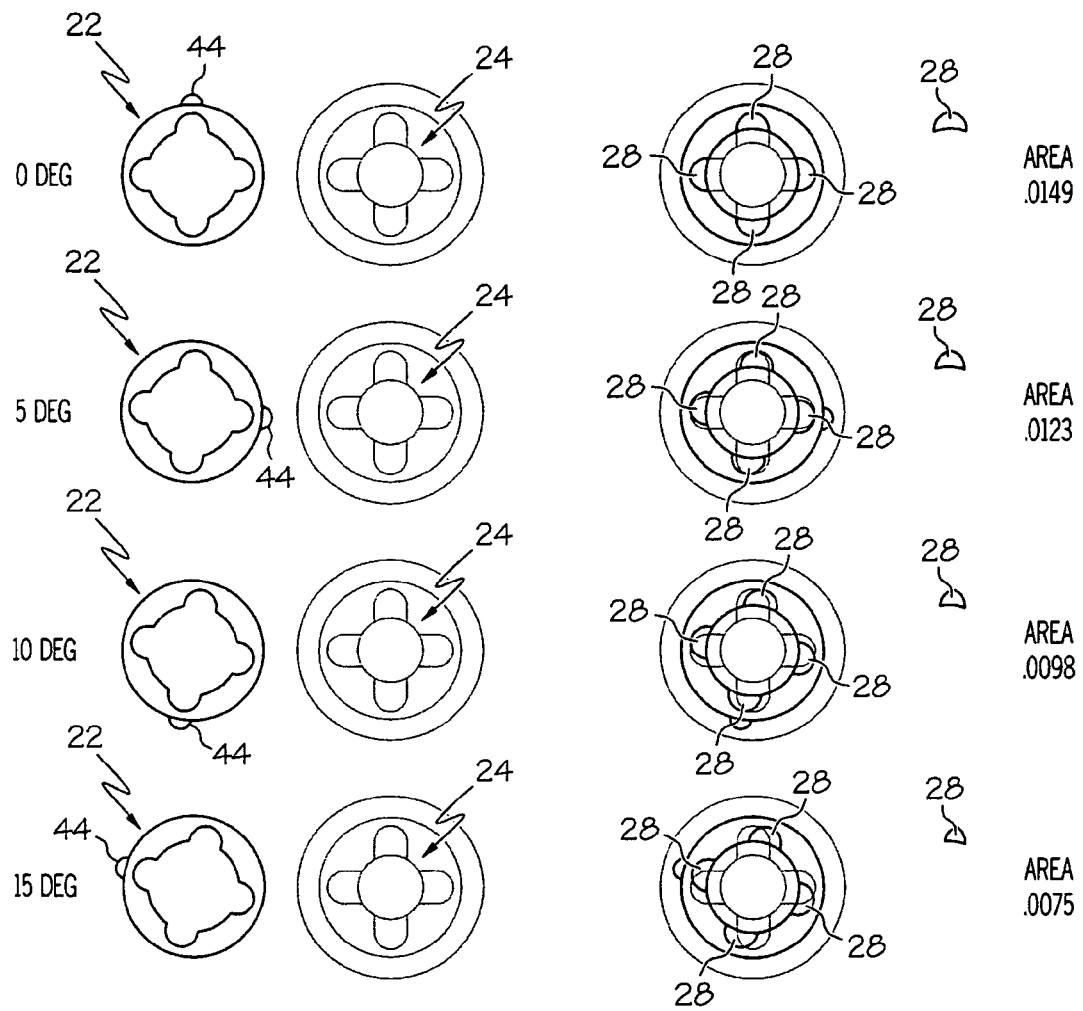
Figure 21A:
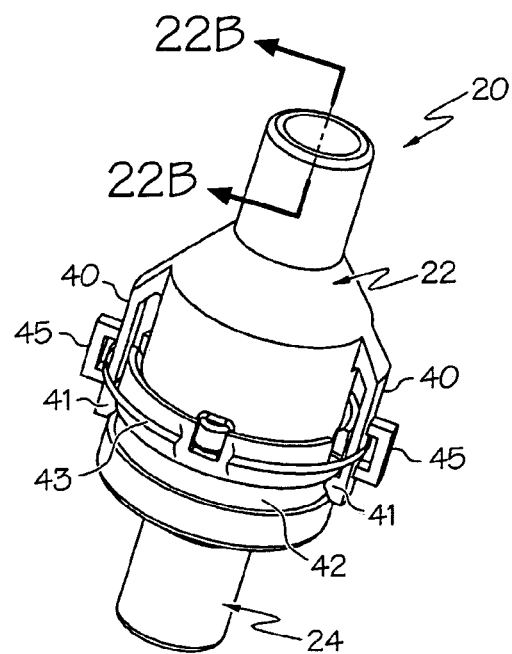
FIG. 21A is a perspective view of the fifth configuration of the restrictor.
Figure 21B:
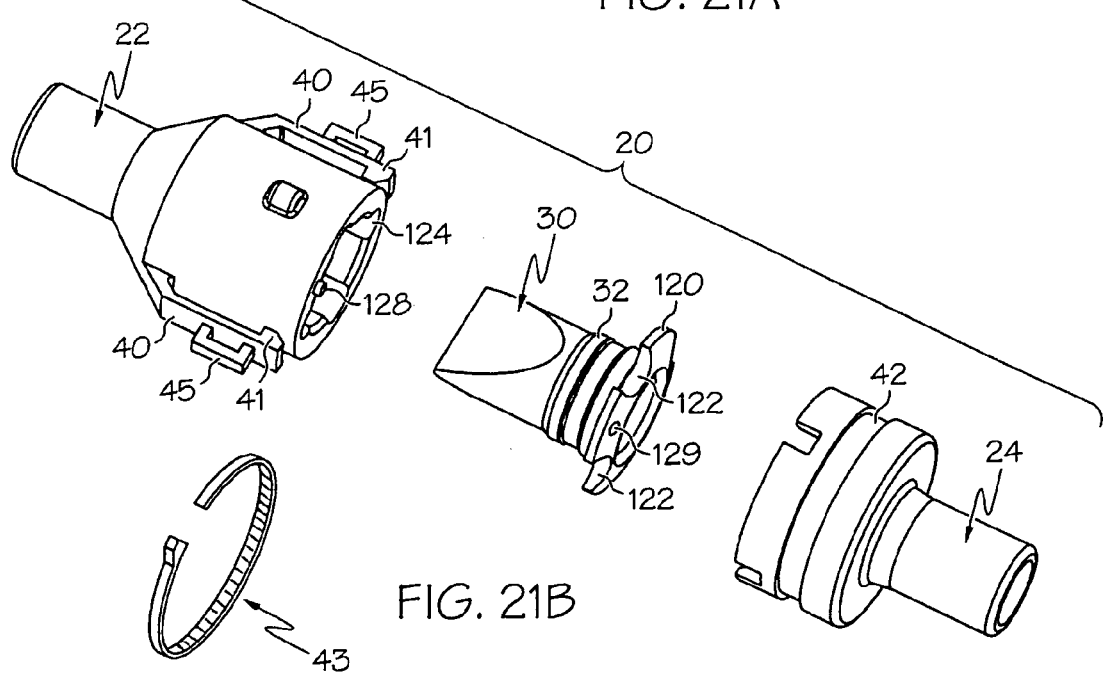
FIG. 21B is an exploded perspective view of the fifth configuration of the restrictor.
Figure 28:
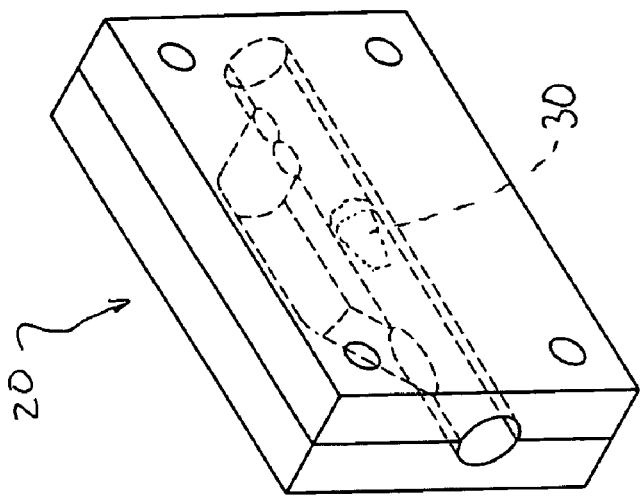
FIG. 28 is a perspective view of the seventh configuration.
Figure 27:
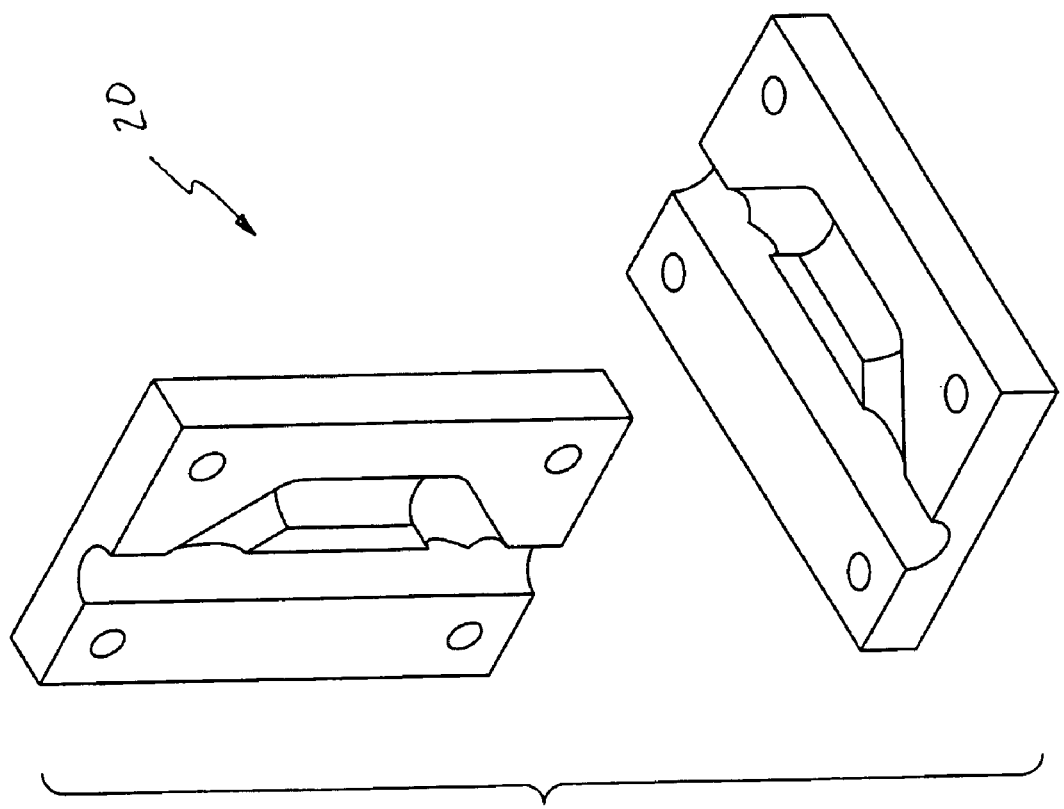
FIG. 27 is an exploded perspective view of a seventh exemplary configuration of the restrictor.

The position of flange 120 is fixed with respect to first body portion 22 with notches 122 in at least partial alignment with channels 124. A peg 128 may be received by a recess or opening 129 in flange 120 to fix the position of valve 30 with respect to first body 22. As explained above, body portions 22 and 24 may be rotated with respect to each other to different angular relationships defined by knob 44 and cutouts 46. Each different angular relationship changes the position of flange 120 with respect to elbows 126 to block a different percentage of elbows 126. Each different angular relationship thus changes the cross section of passageway 28 and thus changes the flow rate through passageway 28. FIG. 20 shows an example of how the different angular positions of body portions 22 and 24 define different cross sections for passageway 28.

FIGS. 25-26 and 27-28 depict other exemplary configurations for the restrictor. The configuration of FIGS. 25-26 uses an alternate airflow pathway 124 that is defined through the body of body portion 22 separate from the primary airflow pathway that receives valve 30. Alternate airflow pathway 30 has a smaller cross sectional area than the main airflow pathway. The configuration of FIGS. 27-28 uses a block having two halves that define a main airflow pathway and an alternate airflow pathway that is serpentine. A valve 30 may be placed in the main airflow pathway. The serpentine nature of the alternate airflow pathway slows the air flow rate back through restrictor 20. The cross sectional area of the alternate airflow pathway also slows the flow.

In one experiment, the C phase timing was tested at 90 milliseconds, 120 milliseconds, and 150 milliseconds. The 150 millisecond test compared to the 90 millisecond test showed an increased peak flow rate of the milk of over 7 percent with an increased average flow rate of 4.97 percent. This test used the Lauren Tri-Circle® silicone liner with vacuum levels of 12, 14, and 15 in HG over an 18 day period. Milk yield was measured over the first two minutes of milking with a fixed pulsator rate of 60 cpm and a fixed pulsator ratio of 65:35. The test shows that the liner closes fast at 90 millisecond and slows the milking rates compared to the 120 millisecond and 150 millisecond rates.

In view of the foregoing, one of ordinary skill in the art will understand that the flow restrictors described above and in the drawings may be used to control the flow of air back into the pulsation chamber to slow the C phase of the pulsation process. Controlling the C phase of the milking cycle is believed to increase milking performance by providing faster milking times while harvesting the same volume of milk as in prior art systems. The restrictors may be reversed to limit vacuum flow from the chamber to control the A phase. Certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are exemplary and the invention is not limited to the exact details shown or described.

The invention claimed is:

1. A milking apparatus comprising:
   a vacuum source;
   a milking liner cooperating with a shell to define a pulsation chamber;
   a pulsator in fluid communication with the pulsation chamber and the vacuum source; the pulsator configured to produce at least a four-phase milking cycle in the milking liner; the cycle including at least an A phase and a C phase; the A phase being wherein the liner is changed from a closed configuration to an open configuration during which the pulsator provides fluid communication between the pulsation chamber and the vacuum source; the C phase being wherein the liner is changed from an open configuration to a closed configuration during which the pulsator allows atmospheric air to flow into the pulsation chamber;
   a restrictor disposed in the path of the fluid communication between the pulsator and the pulsation chamber; the restrictor slowing the C phase compared to the A phase;
   the restrictor having a main airflow pathway and an alternate airflow pathway; the flow rate through the alternate airflow pathway being slower than the flow rate through the main airflow pathway; the atmospheric air flowing into the pulsation chamber during the C phase being directed through the alternate airflow pathway;
   the restrictor having first and second body portions that are movable with respect to one another between at least first and second operational positions; the first operational position defining a first flow rate through the alternate airflow pathway and the second operational position defining a second flow rate through the alternate airflow pathway; the second flow rate being less than the first flow rate; and
   wherein the first and second body portions cooperate to surround a check valve to define the main airflow pathway and the alternate airflow pathway; the check valve providing substantially less or no flow in the alternate airflow pathway direction compared to the main airflow pathway direction; the first and second body portions being movable to different configurations that define the cross sectional area of at least a portion of the alternate airflow pathway.

2. The apparatus of claim 1, further comprising at least one pulsator tube providing fluid communication between the pulsator and the pulsation chamber; the restrictor being carried by the pulsator tube.

3. The milking apparatus of claim 1, wherein the first body portion has a pair of arms that hold the first and second body portions together.

4. The milking apparatus of claim 3, further comprising a band disposed around the arms to hold the arms in place.

5. The milking apparatus of claim 4, wherein the second body portion defines a slot; at least one of the arms engaging the slot.

6. The milking apparatus of claim 1, wherein one of the first and second body portions has a knob and the other of the first and second body portions defining at least two spaced cutouts; the knob being disposed in one of the cutouts when the first and second body portions are disposed in the first operational position and the knob being disposed in the other of the cutouts when the first and second body portions are disposed in the second operational position.

7. The milking apparatus of claim 1, wherein the restrictor defines a longitudinal axis; the check valve including a base flange disposed substantially perpendicular to the longitudinal axis of the restrictor; the base flange defining at least one notch; the alternate airflow pathway passing through the notch.

8. The milking apparatus of claim 7, wherein the position of the check valve is fixed with respect to the first body portion.

9. The milking apparatus of claim 7, wherein the first body portion defines at least one channel disposed along the side of the check valve; the notch of the check valve flange being aligned with the channel; the second body portion defining an elbow air passage; at least a portion of the elbow air passage being aligned with the channel.

10. A milking apparatus comprising:
a vacuum source;
a milking liner cooperating with a shell to define a pulsation chamber; the milking liner being adapted to receive the teat of a dairy animal;
a pulsator in fluid communication with the pulsation chamber and the vacuum source; the pulsator configured to produce at least a milking cycle in the milking liner; the cycle including at least an opening phase and a closing phase; the opening phase being wherein the liner is changed from a closed configuration to an open configuration during which the pulsator provides fluid communication between the pulsation chamber and the vacuum source; the closing phase being wherein the liner is changed from an open configuration to a closed configuration during which the pulsator allows atmospheric air to flow into the pulsation chamber;
a restrictor disposed in the path of the fluid communication between the pulsator and the pulsation chamber;
the restrictor having a main airflow pathway and an alternative airflow pathway; the main airflow pathway having a higher flow rate than the alternative airflow pathway;
the pulsator being in fluid communication with the pulsation chamber through the main airflow pathway during the opening phase;
the pulsator being in fluid communication with the pulsation chamber through the alternative airflow pathway during the closing phase;
the restrictor having at least one element that is movable between at least first and second operational positions; the first operational position defining a first flow rate through the alternate airflow pathway and the second operational position defining a second flow rate through the alternate airflow pathway; the second flow rate being less than the first flow rate; and
wherein the at least one restrictor element that is movable includes first and second body portions that cooperate to surround a check valve to define the main airflow pathway and the alternate airflow pathway: the check valve providing substantially less or no flow in the alternate airflow pathway direction compared to the main airflow pathway direction; the first and second body portions being movable to different configurations that define the cross sectional area of at least a portion of the alternate airflow pathway.

11. The milking apparatus of claim 10, wherein the first body portion has a pair of arms that hold the first and second body portions together.

12. The milking apparatus of claim 11, wherein the second body portion defines a slot; the arms engaging the slot.

13. The milking apparatus of claim 12, further comprising a band disposed around the arms to hold the arms in the slot.

14. The milking apparatus of claim 10, wherein the check valve includes a base flange defining at least one notch; the alternate airflow pathway passing through the notch.

15. A milking apparatus comprising:
a vacuum source;
a milking liner cooperating with a shell to define a pulsation chamber; the milking liner being adapted to receive the teat of a dairy animal;
a pulsator in fluid communication with the pulsation chamber and the vacuum source; the pulsator configured to produce at least a milking cycle in the milking liner; the cycle including at least an opening phase and a closing phase; the opening phase being wherein the liner is changed from a closed configuration to an open configuration during which the pulsator provides fluid communication between the pulsation chamber and the vacuum source; the closing phase being wherein the liner is changed from an open configuration to a closed configuration during which the pulsator allows atmospheric air to flow into the pulsation chamber;
a restrictor disposed in the path of the fluid communication between the pulsator and the pulsation chamber;
the restrictor having a main airflow pathway and an alternative airflow pathway; the main airflow pathway having a higher flow rate than the alternative airflow pathway;
the pulsator being in fluid communication with the pulsation chamber through the main airflow pathway during the opening phase;
the pulsator being in fluid communication with the pulsation chamber through the alternative airflow pathway during the closing phase;
the restrictor having at least one element that is movable between at least first and second operational positions; the first operational position defining a first cross sectional area at a portion of the alternate airflow pathway and the second operational position defining a second cross sectional area at a portion of the alternate airflow pathway; the second cross sectional area being smaller than the first cross sectional area; and wherein the at least one restrictor element that is movable includes first and second body portions that cooperate to surround a check valve to define the main airflow pathway and the alternate airflow pathway: the check valve providing substantially less or no flow in the alternate airflow pathway direction compared to the main airflow pathway direction; the first and second body portions being movable to different configurations that define the cross sectional area of at least a portion of the alternate airflow pathway.

16. The milking apparatus of claim 15, wherein the check valve includes a notched flange is selectively movable with respect to the alternate airflow pathway.

* * * * *